(12) United States Patent
Stroot

(10) Patent No.: US 8,535,534 B2
(45) Date of Patent: Sep. 17, 2013

(54) SOLIDS RETENTION TIME UNCOUPLING BY SELECTIVE WASTING OF SLUDGE

(75) Inventor: Peter G. Stroot, Parker, CO (US)

(73) Assignee: University of South Florida, Tampa, FL (US)

(*) Notice: Subject to any disclaimer, the term of this patent is extended or adjusted under 35 U.S.C. 154(b) by 0 days.

(21) Appl. No.: 13/588,215

(22) Filed: Aug. 17, 2012

(65) Prior Publication Data
US 2012/0305477 A1 Dec. 6, 2012

Related U.S. Application Data

(63) Continuation of application No. PCT/US2011/025242, filed on Feb. 17, 2011.

(60) Provisional application No. 61/305,403, filed on Feb. 17, 2010.

(51) Int. Cl.
*C02F 3/00* (2006.01)

(52) U.S. Cl.
USPC ........... 210/605; 210/614; 210/623; 210/626; 210/628

(58) Field of Classification Search
USPC .................. 210/605, 614, 623, 626, 628
See application file for complete search history.

(56) References Cited

U.S. PATENT DOCUMENTS

| | | | |
|---|---|---|---|
| 4,017,402 | A | 4/1977 | Fitch |
| 5,173,187 | A | 12/1992 | Nader et al. |
| 2007/0199893 | A1 | 8/2007 | Austin et al. |
| 2010/0116734 | A1 | 5/2010 | Wiemers et al. |

FOREIGN PATENT DOCUMENTS

| | | |
|---|---|---|
| JP | 2001079593 A | 3/2001 |
| JP | 2005288268 A | 10/2005 |

OTHER PUBLICATIONS

International Search Report for PCT/US2011/025242 mailed on Oct. 24, 2011.
Brdjanovic, D., A. Slamet, et al. (1998). "Impact of excessive aeration on biological phosphorus removal from wastewater." Water Research 32 (1):: 200-208.
EPA (1996). Clean Watersheds Needs Survey (CWNS). W. D. C. Office of Water.
Goldstein, R. and W. Smith (2002). Water & Sustainability (vol. 4): U.S. Electricity Consumption for Water Supply & Treatment—The Next Half Century. Palo Alto, EPRI.
EPA (2007). Biological Removal Processes and Costs. W. D. C. Office of Water.
Oskowis, J. (2009). Re: Numeric Nutrient Criteria Cost Implications for Florida POTW's G. C. Crist.

(Continued)

*Primary Examiner* — Chester Barry
(74) *Attorney, Agent, or Firm* — Robert J. Varkonyi; Smith & Hopen, P.A.

(57) ABSTRACT

Fluorescence in situ hybridizations were used to identify and determine the abundance of nitrifying bacteria and Anammox bacteria (recycling bacteria) in freshly settled sludge of biological nutrient removal (BNR) secondary clarifiers. An uneven distribution was observed for recycling bacteria in two BNR systems. Settling patterns suggest microcolony formation processes are sensitive to the internal recycle rate, which allow for rapid recycling bacteria microcolony growth by increasing circulation of flocs through the aeration and anoxic basins. Sludge containing high levels of recycling bacteria are selectively collected and separated from the remaining sludge, uncoupling the solids retention time (SRT) of the recycling bacteria from the wasting bacteria. Elevated recycling bacteria SRTs increase concentrations of nitrifying bacteria in the aeration basin and Anammox bacteria in the anoxic basin, improving nitrification and anaerobic ammonium oxidation. Uncoupling the SRT enhances aeration and/or anoxic basin utilization and reduces the overall hydraulic residence time.

16 Claims, 28 Drawing Sheets

(56) References Cited

OTHER PUBLICATIONS

Amann, R. I., W. Ludwig, et al. (1995). "Phylogenetic identification and in situ detection of individual microbial cells without cultivation." Microbiol Rev 59(1): 143-69.

Purkhold, U., A. Pommerening-Roser, et al. (2000). "Phylogeny of all recognized species of ammonia oxidizers based on comparative 16S rRNA and amoA sequence analysis: implications for molecular diversity surveys." Appl Environ Microbiol 66(12): 5368-82.

Juretschko, S., G. Timmermann, et al. (1998). "Combined molecular and conventional analyses of nitrifying bacterium diversity in activated sludge: Nitrosococcus mobilis and *Nitrospira*-like bacteria as dominant populations." Appl Environ Microbiol 64(8): 3042-51.

Burrell, P., J. Keller, et al. (1999). "Characterisation of the bacterial consortium involved in nitrite oxidation in activated sludge." Water Science and Technology 39(6): 45-52.

Aoi, Y., T. Miyoshi, et al. (2000) "Microbial ecology of nitrifying bacteria in wastewater treatment process examined by fluorescence in situ hybridization." J Biosci Bioeng 90(3): 234-40.

Coskuner, G. and T. P. Curtis (2002). "In situ characterization of nitrifiers in an activated sludge plant: detection of *Nitrobacter* Spp." J Appl Microbiol 93(3): 431-7.

Dionisi, H. M., A. C. Layton, et al. (2002). "Quantification of Nitrosomonas oligotropha-like ammonia-oxidizing bacteria and *Nitrospira* spp. from full-scale wastewater treatment plants by competitive PCR." Appl Environ Microbiol 68(1): 245-53.

Harms, G., A. C. Layton, et al. (2003). "Real-time PCR quantification of nitrifying bacteria in a municipal wastewater treatment plant." Environ Sci Technol 37(2): 343-51.

Siripong, S. and B. E. Rittmann (2007). "Diversity study of nitrifying bacteria in full-scale municipal wastewater treatment plants." Water Research 41(5): 1110-1120.

Schmidt, I., O. Sliekers, et al. (2003). "New concepts of microbial treatment processes for the nitrogen removal in wastewater." Fems Microbiology Reviews 27(4): 481-492.

Milner, M. G., T. P. Curtis, et al. (2008). "Presence and activity of ammonia-oxidising bacteria detected amongst the overall bacterial diversity along a physico-chemical gradient of a nitrifying wastewater treatment plant." Water Research 42(12): 2863-2872.

Oerther, D. B., J. Pernthaler, et al. (2000). "Monitoring precursor 16S rRNAs of *Acinetobacter* spp. in activated sludge wastewater treatment systems." Applied and Environmental Microbiology 66(5): 2154-2165.

DelosReyes, F. L., W. Ritter, et al. (1997). "Group-specific small-subunit rRNA hybridization probes to characterize filamentous foaming in activated sludge systems." Applied and Environmental Microbiology 63(3): 1107-1117.

Mobarry, B. K., M. Wagner, et al. (1996). "Phylogenetic probes for analyzing abundance and spatial organization of nitrifying bacteria." Appl Environ Microbiol 62(6): 2156-62.

Wagner, M., G. Rath, et al. (1996). "In situ analysis of nitrifying bacteria in sewage treatment plants." Water Science and Technology 34(1-2): 237-244.

Schramm, A., D. de Beer, et al. (1998). "Identification and activities in situ of Nitrosospira and *Nitrospira* spp. as dominant populations in a nitrifying fluidized bed reactor." Applied and Environmental Microbiology 64(9): 3480-3485.

Schmid M., Walsh K., Webb R., Rijpstra W. l., van de Pas-Schoonen K., Verbruggen M. J., Hill T., Moffett B., Fuerst J., Schouten S., Damsté J. S., Harris J., Shaw P., Jetten M., Strous M. (2003). "Candidatus "*Scalindua brodae*", sp. nov., Candidatus "*Scalindua wagneri*", sp. nov., two new species of anaerobic ammonium oxidizing bacteria." Syst Appl Microbiol. Nov; 26(4):529-38.

DeLong, E. F., G. S. Wickham, et al. (1989). "Phylogenetic stains: ribosomal RNA-based probes for the identification of single cells." Science 243(4896): 1360-3.

Loy, A., F. Maixner, et al. (2007). "probeBase—an online resource for rRNA-targeted oligonucleotide probes: new features 2007." Nucleic Acids Res. 35: D800-D804.

Daims, H., J. L. Nielsen, et al. (2001). "In situ characterization of *Nitrospira*-like nitrite oxidizing bacteria active in wastewater treatment plants." Applied and Environmental Microbiology 67(11): 5273-5284.

Manz, W., M. Eisenbrecher, et al. (1998). "Abundance and spatial organization of Gram-negative sulfate-reducing bacteria in activated sludge investigated by in situ probing with specific 16S rRNA targeted oligonucleotides." Fems Microbiology Ecology 25(1): 43-61.

SOLIDS RETENTION TIME UNCOUPLING BY SELECTIVE WASTING OF SLUDGE

CROSS REFERENCE TO RELATED APPLICATION

This application is a continuation of and claims priority to International Patent Application No. PCT/US11/25242, entitled "Solids Retention Time Uncoupling By Selective Wasting of Sludge," filed Feb. 17, 2011 which is a non-provisional of and claims priority to U.S. Provisional Patent Application No. 61/305,403, entitled "Solids Retention Time Uncoupling in Activated Sludge Systems by Selective Wasting of Sludge in the Secondary Clarifier," filed on Feb. 17, 2010, the contents of which are herein incorporated by reference.

FIELD OF INVENTION

This invention relates to wastewater treatment. Specifically, the invention provides methods and devices for enhancing the removal of nitrogen from wastewater.

BACKGROUND OF THE INVENTION

For the past century, environmental engineers have been using the activated sludge system and anaerobic digestion to successfully treat municipal wastewater (Metcalf & Eddy (2003). *Wastewater Engineering: Treatment and Reuse*. New York, N.Y., McGraw-Hill). In the United States, the nitrification process in the activated sludge system of public owned treatment works (POTWs) is very expensive with capital costs of the aeration basin alone valued at $26B and annual electricity costs of $335M (EPA (1996). Clean Watersheds Needs Survey (CWNS). W. D. C. Office of Water; Goldstein, R. and W. Smith (2002). Water & Sustainability (Volume 4): U.S. Electricity Consumption for Water Supply & Treatment—The Next Half Century. Palo Alto, EPRI; EPA (2007). Biological Removal Processes and Costs. W. D. C. Office of Water). More recently, the United States Environmental Protection Agency has proposed a stricter effluent nutrient limit (Total N of 0.82-1.73 mg/L and Total P of 0.069-0.415 mg/L) for Florida POTWs that is estimated to cost $24.4-50.7B in capital investment and increase annual operating expenses by $0.4-1.3B (Oskowis, J. (2009). Re: Numeric Nutrient Criteria Cost Implications for Florida POTW's G. C. Crist). Over half of the capital investment will upgrade the existing activated sludge system to an advanced biological nutrient removal (BNR) system. It is anticipated that the numerous extended aeration plants used for secondary treatment of wastewater in FL will be upgraded to BP5 or other advanced BNR system. The BP5 upgrade of the extended aeration plants will most likely not include the introduction of a primary clarifier and instead, the process will be operated with an elevated IRR. The impact of the IRR on the microbial ecology of BNR systems has not been reported.

Researchers used empirical studies to identify key operating parameters for these systems to ensure effective performance. In order to increase the protection of surface waters from excessive oxygen demand from treated wastewater, engineers have modified the simple aeration basin to include anoxic and anaerobic zones and recycled nitrate-rich wastewater and anaerobic digester supernatant to promote biological nutrient removal. For biological nitrogen removal, the operation of the conventional activated sludge system was modified to include a nitrification step for the biological conversion of ammonium to nitrate, which is subsequently removed via denitrification to nitrogen gas by an anoxic zone in the activated sludge system or fixed-film denitrification process of the secondary clarifier effluent. These activated sludge system designs and operations are dependent on providing adequate biomass concentration in the aeration tank, environmental conditions for the biomass, and adequate time for the bioreaction. Carbonaceous biochemical oxygen demand (BOD) and ammonium are consumed as substrate by the heterotrophic and nitrifying bacteria, respectively. The heterotrophic bacteria grow much faster than the nitrifying bacteria, which handicap the current activated sludge system. Because the overall reaction rate (r) for BOD or ammonium is directly related to the product of the specific growth rate (p) and biomass concentration (X), the nitrification rate requires much higher biomass concentration to compensate for the much lower specific growth rate compared to the heterotrophic bacteria.

The conventional nitrification process requires a lengthy solids retention time (SRT), which prevents the washout of the slow-growing nitrifying bacteria and provides sufficient biomass to ensure adequate bulk nitrification rates. The biomass concentration of both heterotrophic and nitrifying bacteria is directly related to the wasting rate of the settled sludge from the secondary clarifier, with SRT increasing as the wasting rate decreases. To achieve complete nitrification (ammonium oxidation to nitrate), the activated sludge system is typically operated at an elevated SRT of 8 days or more. This SRT ensures an adequate concentration of nitrifying bacteria, but also results in the accumulation of the heterotrophic bacteria. While this approach has been successful in treating both BOD and Ammonium, the aeration basin is not efficient.

The internal recycle of the nitrate-rich, treated wastewater to an anoxic basin or zone is commonly used in suspended growth systems to reduce the nitrate concentration of treated wastewater in subsequent treatment basins or the secondary clarifier (Metcalf & Eddy (2003). *Wastewater Engineering: Treatment and Reuse*. New York, N.Y., McGraw-Hill). High internal recycle rates (IRR) above 400% offer minimal improvement with respect to nitrate concentration and may cause aerobic conditions in the anoxic basin. However, in the Tampa metro region, four public owned treatment works (POTWs) that utilize the 5-stage BardenPho (BP5) process for nitrogen and phosphorus removal, reported high IRR of 545-806% (personal communication). This high IRR for this type of BNR system far exceeds guidelines, but is most likely due the lack of a primary clarifier in these systems (Metcalf & Eddy (2003). *Wastewater Engineering: Treatment and Reuse*. New York, N.Y., McGraw-Hill). The additional primary solids entering the fermentation stage provides both fermentative bacteria and organic substrate for the generation of volatile fatty acids, which is necessary for phosphorus accumulating organisms (PAO). However, the primary solids require additional aerobic treatment. In essence, the high IRR results in a hybrid BNR system that is both BP5 system and aerobic digester, which is possible by increasing the IRR. All four POTWs that employ the high IRR report excellent nitrogen and phosphorus removal.

With the discovery of the phylogenetic tree of life, the major microbial populations were identified in biological reactor systems using mature molecular biology tools, such as membrane hybridizations and fluorescence in situ hybridizations (FISH) (Amann, R. I., W. Ludwig, et al. (1995). "Phylogenetic identification and in situ detection of individual microbial cells without cultivation." *Microbiol Rev* 59(1): 143-69). Recently, molecular biology tools have been developed and successfully utilized to determine the microbial community structure and function in these systems. The investigation of the microbiology of biological reactor systems consists of determining the identity and abundance of microbes present (microbial community structure) and their role in the activated sludge process (microbial community function). Traditionally, light microscopy or culture-based methods were used to characterize the microbial structure of biological reactor systems. More recently, new tools that draw on molecular biology and a new view of the phylogeny of life have been developed to identity bacteria and determine their function.

The nitrification process is an example of a well-studied process, whose fundamental knowledge of the microbial ecology is still evolving. For years, the practicing engineer was taught that the process was dominated by species of the genera *Nitrosomonas* and *Nitrobacter*, which represent the ammonia oxidizing bacteria (AOB) and nitrite oxidizing bacteria (NOB), respectively. The diversity of recognized species of AOB was evaluated by both 16S rRNA and amoA sequence information and three major groups were identified: (1) nitrosomonads, which has five distinct clusters, (2) *Nitrosospira* species, and (3) *Nitrosococcus* species (Purkhold, U., A. Pommerening-Roser, et al. (2000). "Phylogeny of all recognized species of ammonia oxidizers based on comparative 16S rRNA and amoA sequence analysis: implications for molecular diversity surveys." *Appl Environ Microbiol* 66(12): 5368-82). The nitrosomonads were the dominant AOB in all but two of eleven wastewater treatment plants evaluated in this study. More recently, this fundamental knowledge of the nitrification process was updated by the findings from the application of molecular biology based methods, which determined that the predominant AOB are nitrosomonads and *Nitrosospira*, while the dominant NOB is *Nitrospira* (Juretschko, S., G. Timmermann, et al. (1998). "Combined molecular and conventional analyses of nitrifying bacterium diversity in activated sludge: *Nitrosococcus mobilis* and *Nitrospira*-like bacteria as dominant populations." *Appl Environ Microbiol* 64(8): 3042-51; Burrell, P., J. Keller, et al. (1999). "Characterisation of the bacterial consortium involved in nitrite oxidation in activated sludge." *Water Science and Technology* 39(6): 45-52; Aoi, Y., T. Miyoshi, et al. (2000). "Microbial ecology of nitrifying bacteria in wastewater treatment process examined by fluorescence in situ hybridization." *J Biosci Bioeng* 90(3): 234-40; Coskuner, G. and T. P. Curtis (2002). "In situ characterization of nitrifiers in an activated sludge plant: detection of *Nitrobacter* Spp." *J Appl Microbiol* 93(3): 431-7; Dionisi, H. M., A. C. Layton, et al. (2002). "Quantification of *Nitrosomonas oligotropha*-like ammonia-oxidizing bacteria and *Nitrospira* spp. from full-scale wastewater treatment plants by competitive PCR." *Appl Environ Microbiol* 68(1): 245-53; Harms, G., A. C. Layton, et al. (2003). "Real-time PCR quantification of nitrifying bacteria in a municipal wastewater treatment plant." *Environ Sci Technol* 37(2): 343-51). A more recent study of seven full-scale wastewater treatment plants revealed that nitrosomonads and *Nitrosospira*, and *Nitrobacter* and *Nitrospira* were the dominant AOB and NOB, respectively (Siripong, S. and B. E. Rittmann (2007). "Diversity study of nitrifying bacteria in full-scale municipal wastewater treatment plants." *Water Research* 41(5): 1110-1120). The diversity of the nitrifying bacteria was very similar across the seven plants; however, seasonal temperature variation was identified as a cause of changes in diversity. The authors suggested that the coexistence of these nitrifiers is evidence of functional redundancy, which assists in maintaining performance stability. Beyond nitrification, *Nitrosomonas* strains have demonstrated the capability to denitrify (Schmidt, I., O. Sliekers, et al. (2003). "New concepts of microbial treatment processes for the nitrogen removal in wastewater." *Fems Microbiology Reviews* 27(4): 481-492; Milner, M. G., T. P. Curtis, et al. (2008). "Presence and activity of ammonia-oxidising bacteria detected amongst the overall bacterial diversity along a physico-chemical gradient of a nitrifying wastewater treatment plant." *Water Research* 42(12): 2863-2872).

However, current wastewater technology does not separate the SRT of nitrifying from other bacteria, and therefore inefficiently uses bacteria to aid in wastewater treatment. Accordingly, the present invention provides methods to uncouple the SRT of the nitrifying bacteria and other microorganism of interest from the SRT of the remaining bacteria to enhance nitrification or other metabolic functions necessary for efficient biological treatment of wastewater.

SUMMARY OF THE INVENTION

The nitrification of wastewater may be enhanced by determining the settling location of nitrifying bacteria versus non-nitrifying bacteria in a secondary clarifier. A series of samples is collected from the freshly settled sludge at predetermined sampling locations in the secondary clarifier. To ensure that the sludge collected from the top of the sludge blanket is freshly settled, the clarifier rake system may be disabled for 30-60 minutes. The samples may be collected from 10 feet, 40 feet, 55 feet, 70 feet, 85 feet, 100 feet, 140 feet, 155 feet, 170 feet from a clarifier inlet for a High Purity $O_2$ System and Nitrification System; 8 feet, 13 feet, 18 feet, 23 feet, 28 feet, 33 feet, 38 feet, 45 feet, 55 feet or combinations thereof from the inlet for a Modified Ludzack-Ettinger system; or 5 feet, 8.5 feet, 10.5 feet, 12.5 feet, 15 feet, 20 feet, 25 feet, 30 feet, 32.5 feet, 37.5 feet of combinations thereof from the inlet for a BardenPho 5-Stage system. The samples may consist of a 1 mL sample collected from the top one-inch layer of the sludge blanket. The samples were then tested using species-specific analysis to determine the settling characteristics and concentrations of bacteria in the secondary clarifier. Exemplary genus-specific analyses include selective culturing, probing, nucleic acid-based identification, immunohistochemistry, and lab-scale bioreactors that are adapted to measure the specific rate of nitrification. It has been found that fluorescence in situ hybridization is particularly useful.

Fluorescence in situ hybridizations with oligonucleotide probes that target distinct microbial populations showed the abundance of nitrifying bacteria, *Acinetobacter*, and Anammox bacteria in the freshly settled sludge in secondary clarifiers of three distinct, full-scale biological nutrient removal (BNR) systems. An uneven distribution was observed for nitrifying bacteria and Anammox bacteria in two BNR systems, Nitrification System (0% internal recycle rate) and Modified Ludzack Ettinger System (300% internal recycle rate), while an even distribution of nitrifying bacteria and Anammox bacteria was observed in the third BNR system, a 5-stage BardenPho System (806% internal recycle rate). For the Nitrification System, detached microcolonies of nitrifying bacteria and Anammox bacteria were present in the region furthest from the secondary clarifier inlet.

For the Modified Ludzack Ettinger System, three regions with increasing distance from the inlet of the secondary clarifier exhibited distinct characteristics with respect to microcolonies of nitrifying bacteria and Anammox bacteria. In the first region near the inlet of the secondary clarifier, the sludge exhibited large flocs with attached microcolonies of nitrifying bacteria and Anammox bacteria. In the second region, the sludge exhibited flocs without attached microcolonies of nitrifying bacteria and Anammox bacteria. In the third region, the sludge exhibited high levels of detached microcolonies of nitrifying bacteria and Anammox bacteria. For the 5-stage BardenPho System, all of the sludge throughout the secondary clarifier exhibited both large flocs with attached microcolonies of nitrifying bacteria and Anammox bacteria and some large flocs without attached microcolonies of nitrifying bacteria and Anammox bacteria. Taken together, these observations suggested a microcolony formation process that is sensitive to the internal recycle rate.

In the Nitrification System, nitrifying bacteria and Anammox bacteria cells grow on the surface of flocs and generate microcolonies that eventually release from the floc due to shear and settle further away from the clarifier inlet. Moderate and elevated internal recycle rates reduce the shear effect and microcolonies remain attached to flocs. In addition, the internal recycle provides an opportunity for rapid microcolony growth due to a large fraction of flocs passing through the aeration basin multiple times before passing to the secondary clarifier. Historically, the internal recycle rate was introduced to provide an opportunity for denitrification, which improves sludge settling in the secondary clarifier. The results from this study suggest that the internal recycle rate may also play an important role in increasing floc size for improving sludge settling and generating microcolonies of nitrifying bacteria and Anammox bacteria. With a more complete understanding of the how the internal recycle rate and the microcolony formation process influence the distribution of nitrifying bacteria and Anammox bacteria in the freshly settled sludge of secondary clarifiers, a new avenue may present itself for the design and operation of more cost-effective BNR systems that optimize the microbial ecology of the nitrifying bacteria and Anammox bacteria.

After the bacteria settling location was identified, at least one inlet port may be placed in the secondary clarifier to collect the nitrifying bacteria and Anammox bacteria at the settling location of the nitrifying bacteria and Anammox bacteria in the secondary clarifier or disposing an inlet port in the secondary clarifier to collect sludge without nitrifying bacteria and Anammox bacteria in the secondary clarifier and wasting this sludge. The nitrifying bacteria and Anammox bacteria may then be returned to one or more wastewaters basin to remove nitrogen contaminants from the wastewater. Exemplary inlet ports include a Waste Activated Sludge inlet, which includes one or more negative pressure housings having at least one horizontal face, disposed on the floor of the clarifier. A negative pressure manifold is placed in at least one horizontal face of the negative pressure housing, about where the identified bacteria populate. The negative pressure manifold is attached to a negative pressure line, allowing a control module to apply negative pressure around the negative pressure manifold thereby permitting collection of bacteria surrounding the negative pressure manifold. Alternatively, a Waste Activated Sludge rake may be used to collect bacteria. The rake comprises at least one horizontal support arm; with a plurality of vertical support members connected to the at least one horizontal support arm. A plurality of selective inputs is provided on the at least one horizontal support arm or on the plurality of vertical support members, and connected to a plurality of negative pressure lines. The negative pressure lines are independently connected to the selective inputs, meaning each input is connected to one negative pressure line. A negative pressure source attaches to the other end of each negative pressure line, under control of a control module, allowing selective activation of the selective inputs. Exemplary negative pressure sources include an air pump; a liquid pump; or a vacuous container. In some variations, the control module controls the pressure applied to the negative pressure manifold or selective inputs using a negative pressure valve, such as a solenoid valve, to direct negative pressure through specific negative pressure lines.

In more specific variations of the rake, the Waste Activated Sludge rake includes an upper horizontal support arm with a plurality of vertical support members connected to the upper horizontal support arm at an upper end of the vertical supports. The bottom end of the vertical support members is attached to a lower horizontal support arm, such that the vertical support members connect the upper and lower horizontal support arms. At least one sludge blade is attached to the lower edge of the lower horizontal support arm. A plurality of selective inputs is placed on the rake to allow selective collection of bacteria from the clarifier. Exemplary locations include placing the selective inputs on the plurality of vertical support members, the lower horizontal support arm, the at least one sludge blade, or a combination thereof. A plurality of negative pressure lines connects each selective input on a first end to a negative pressure source on a second end, with the negative pressure controlled by a control module in fluid communication with the negative pressure source.

The bacteria collection port or ports, which include the negative pressure manifold or selective input, is placed in the clarifier based on the desired action. To collect the nitrifying bacteria or Anammox bacteria, the port or ports are disposed in the outer half of the secondary clarifier, whereas to collect sludge that does not have nitrifying bacteria or Anammox bacteria in the secondary clarifier, the ports are disposed in the inner half of the secondary clarifier.

The BNR system may also be enhanced by adding a predetermined amount of a heterotrophic bacteria having known and distinct settling properties to the aeration basin. Exemplary heterotrophic bacteria include phosphorus accumulating organisms (PAO) or proprietary bacteria used for bioaugmentation (In Pipe Technology Company, Inc., Wheaton Ill.). The use of these heterotrophic bacteria may be used independent of, or in addition to, the selective collection of bacteria described above.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

By selective wasting of the heterotrophic biomass from the secondary clarifier, the SRT for the nitrifying bacteria can be increased significantly. This increase in the SRT for the nitrifying bacteria results in a much higher concentration of the nitrifying bacteria in the aeration basin and, therefore, much higher overall nitrification rates. When the SRT are uncoupled, the aeration basin can be efficiently utilized and the overall hydraulic residence time can be reduced for both capital and operating costs savings.

As used herein, "about" means approximately or nearly and in the context of a numerical value or range set forth means±15% of the numerical.

As used herein, "selective culturing" means methods of determining microbial presence using culturing techniques. For example, culturing a sample in LB broth may be used to determine bacterial presence in the sample. Other culture methods are also envisioned, such as selective and differential media systems like MacConkey's agar and mEI agar. Additional selective culturing conditions or inclusion of additional techniques after culturing, such as NASBA, sequencing, PCR, or RFLP haplotyping, may be used to identify particular microbes.

As used herein, "nucleic acid-based identification" means an assay which uses oligonucleotide sequences to selectively hybridize to target sequences. The "oligonucleotide" is a nucleic acid sequence isolated from a natural source, synthetically manufactured, produced from restriction enzyme digestion, or genetically engineered. The oligonucleotide may be suspended in a solution or attached to a support, such as covalently attached to a support. Exemplary nucleic acid-based identification assays include PCR, RAPD-PCR, nucleic acid probes, NASBA, plasmid fingerprinting, and sequencing.

As used herein, "sequence-based identification" means an assay using the sequence of component molecules making up a larger molecule or polymer to identify microorganisms. The detection assay may use sequencing of oligonucleotides peptides, or other biological polymers. Exemplary detection methods include solid phase and liquid phase arrays, Edman degradation with HPLC and liquid chromatography-mass spectrometry (LC-MS) for proteins, and the Sanger and Maxim-Gilbert methods for nucleic acids.

As used herein, "nitrification" means the oxidation of ammonia into nitrite followed by the oxidation of these nitrites into nitrates.

As used herein, "nitrifying bacteria" means ammonia and nitrite oxidizing bacteria can be found among the β- and γ-proteobacteria. Examples include bacteria belonging to the genera *Nitrosomonas Nitrosococcus, Nitrosospira*, and *Nitrobacter*, and members of the phylum Nitrospirae.

As used herein, "Anammox bacteria" means bacteria capable of anaerobic ammonium oxidation, where ammonium and nitrite are converted to nitrogen gas.

Figure 1:
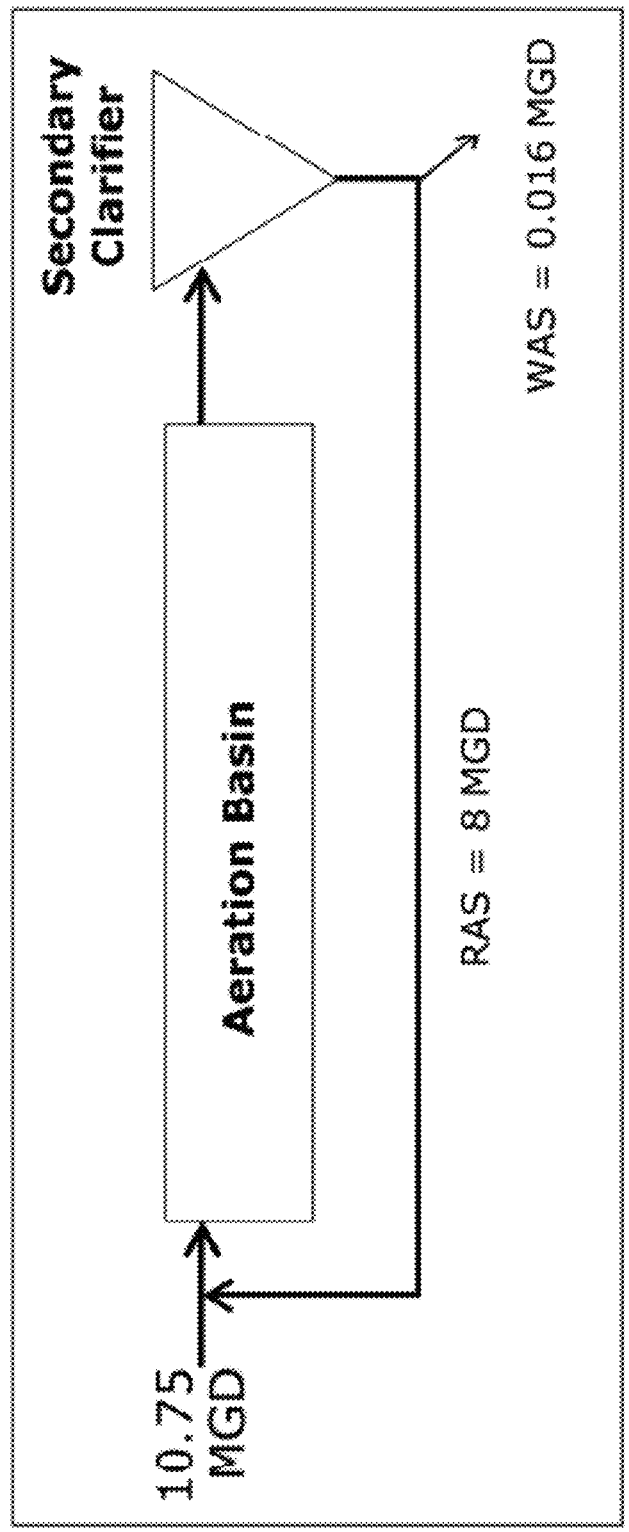
FIG. 1 is an illustration showing the basic schematic of an activated sludge system. The Waste Activated Sludge (WAS) flow rate is adjusted to control the Solids Retention Time (SRT) of the process and is approximately 1.5-4% of the Return Activated Sludge (RAS) flow rate.

A typical, completely-mixed activated sludge system, as seen in FIG. 1, consists of an aeration basin and secondary clarifier. With this system the soluble pollution, such as BOD and ammonium, are treated effectively, because the system can be used to increase the overall biomass concentration in the aeration basin for high rates of treatment. For example, the rate of BOD removal is the product of the overall heterotrophic bacteria concentration ($X_{heterotrophs}$) and the specific growth rate of these bacteria ($\mu_{heterotrophs}$). Likewise, the rate of nitrification is a product of the nitrifying bacteria biomass concentration ($X_{nitrifiers}$) and the specific growth rate of these bacteria ($\mu_{nitrifiers}$).). Likewise, the rate of anaerobic ammonium oxidation is a product of the Anammox bacteria biomass concentration ($X_{Anammox}$) and the specific growth rate of these bacteria ($\mu_{Anammox}$). In the activated sludge system, the overall biomass concentration ($X_{total}=X_{heterotrophs}+X_{Anammox}+X_{nitrifiers}$) is maintained at high concentrations by reducing the wasting rate of the settled sludge in the secondary clarifier. Based on typical domestic wastewater characteristics and stoichiometry, the $X_{nitrifiers}$ is estimated to be approximately 5% of the $X_{total}$.

The solids retention time (SRT) and hydraulic retention time (HRT) are defined by:

a. $SRT=(V \cdot X)/(Q_{WAS} \cdot X_{WAS})$ (1)

b. $HRT=V/Q$ (2)

Rearranging the SRT equation and solving for the wasting rate provides:

a. $Q_{WAS}=(V \cdot X)/(X_{WAS} \cdot SRT_{overall})$ (3)

$X_{WAS}=X_{RAS}$, so we can substitute into this equation:

a. $Q_{WAS}=(V \cdot X)/(X_{RAS} \cdot SRT_{overall})$ (4)

Interestingly, typical flow rates and HRT for secondary clarifiers result in $Q_{WAS}=\sim 2\%\ Q_{RAS}$.

In order to ensure nitrification in an activated sludge system, the SRT is kept high to values above 8 days. This is a direct result of the slower specific growth rate of the nitrifying bacteria compared to the heterotrophic bacteria. For the design of these systems, the maximum specific growth rates of the heterotrophic bacteria and nitrifying bacteria are 6 d$^{-1}$ and 0.5 d$^{-1}$, respectively. Anammox bacteria are typically not considered in the design of these systems.

In addition to accommodating the slow growing nitrifying bacteria, the elevated SRT also increases the biomass concentration of both nitrifying, Anammox, and heterotrophic bacteria. The additional biomass proportionally increases the overall removal rate (r) of BOD and ammonium, and nitrate, since $r=\mu \cdot X$. In other words, $r_{BOD}=\mu_{heterotrophic\ bacteria} \cdot X_{heterotrophic\ bacteria}$; $r_{Anammox}=\mu_{Anammox\ bacteria} \cdot X_{Anammox\ bacteria}$; and $r_{nitrification}=\mu_{nitrifying\ bacteria} \cdot X_{nitrifying\ bacteria}$. (The yield coefficient (Y) is necessary to explicitly calculate these rates of removal; $r=-\mu \cdot X/Y$.) By operating the activated sludge system at the elevated design SRT, the BOD is removed prior to the ammonium. With the current approach to wasting sludge from this system, the aeration basin is being operated inefficiently. The ideal operation of this system, the achievement of BOD and ammonium removal goals would be achieved at the same time in the aeration basin. In other words, HRT would be sufficient to meet both BOD and ammonium treatment goals. One approach to optimizing the efficiency and utilization of the aeration basin is to uncouple the SRT for the nitrifying bacteria from the heterotrophic bacteria and Anammox bacteria. Selective wasting of activated sludge that does not contain any nitrifying bacteria would effectively uncouple the SRTs. This uncoupling would increase the $X_{nitrifiers}$ without impacting $X_{heterotrophs}$ or $X_{Anammox}$. For example, the design SRT of 10 days could be uncoupled with the $SRT_{nitrifiers}$=100 days, which would double the $X_{nitrifiers}$. The doubling of $X_{nitrifiers}$ would effectively double the rate of nitrification in the aeration basin and reduces the design HRT by half necessary for meeting the ammonium removal goal.

a. $Q_{WAS}=(V \cdot X)/(X_{RAS} \cdot SRT_{overall})$ (5)

Rearranged and solving for $SRT_{overall}$:

a. $SRT_{overall}=(V \cdot X)/(X_{RAS} \cdot Q_{WAS})$ (6)

However, each microbial population of interest has their own SRT. For example, the nitrifying bacteria SRT is determined by the following equation:

a. $SRT_{nitrifying\ bacteria}=(V \cdot X_{nitrifying\ bacteria})/(X_{RAS \cdot \%\ nitrifying\ bacteria} \cdot Q_{WAS\ nitrifying\ bacteria})$ (7)

If $Q_{WAS\ nitrifying\ bacteria}=0$ due to selective wasting of settled sludge containing no nitrifying bacteria, then the $SRT_{nitrifying\ bacteria}=\infty$.

The $X_{nitrifying\ bacteria}$ in the aeration basin can be determined by merging the mass balance equations for biomass and substrate resulting in the following equation:

a. $X_{nitrifying\ bacteria} = (SRT_{nitrifying\ bacteria}/HRT) \cdot [(Y \cdot (S_o - S))/(1+(k_d) \cdot SRT_{nitrifying\ bacteria})]$ (8)

Therefore, selective wasting of the heterotrophic biomass from the secondary clarifier, namely selectively collecting nitrifying bacteria, is used to convert a conventional activated sludge system designed for BOD removal (SRT=5 days) to improve the nitrifying bacteria concentration.

Example 1

Uncoupling SRT

To maintain a design SRT in a BNR system, a portion of the settled sludge in the secondary clarifier is wasted continuously. In reality, this portion is approximately 1.3% of the total settled sludge flow rate (RAS+WAS flow rates). The bulk of the total settled sludge is returned to the aeration basing and is called the Return Activated Sludge (RAS). A typical secondary clarifier is operated in a quiescent manner, which allows for gravity settling of activated sludge flocs. The flocs have a range of sizes and density and consist of a mixture of different bacteria. Some flocs will consist entirely of heterotrophic bacteria, while others will consist of all types. In a circular shaped secondary clarifier, the activated sludge enters through the center and flows in a radial direction to the outside diameter, where the clarified liquid spills over a weir. The flocs settle in a predictable manner based on their size and density. The settled sludge is scraped by a slowly rotating rake that moves the settled sludge to a sludge pit. As the settled sludge is moved to the sludge pit, the sludges are mixed into a homogenous composition of heterotrophic, Anammox, and nitrifying bacteria. The settled sludge in the pit is pumped by both RAS and WAS pumps continuously.

Figure 2:
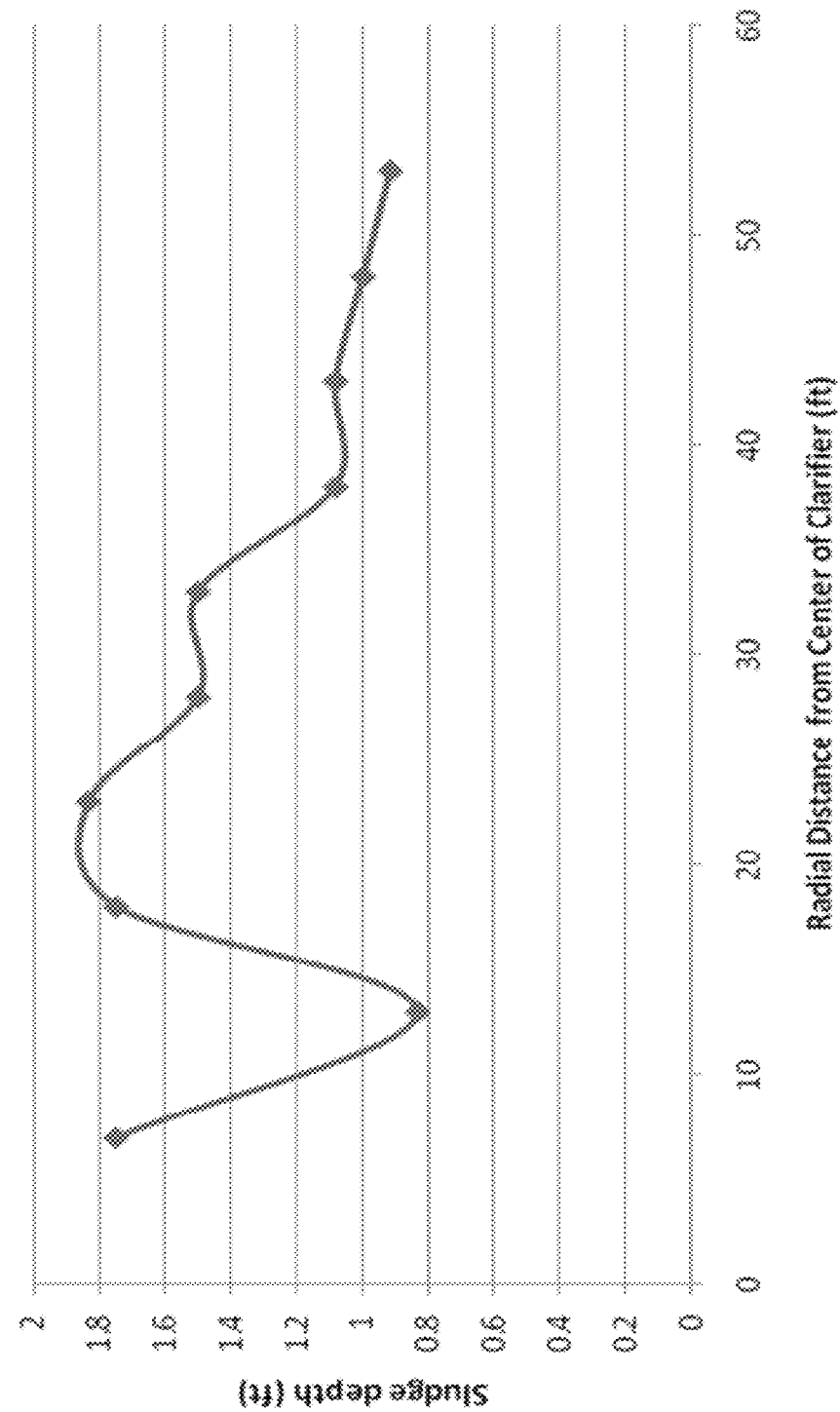
FIG. 2 is a graph showing the sludge depth distribution of a typical secondary clarifier as a function of the radial distance.

FIG. 2 is an example of the distribution of the sludge depth at the bottom of the clarifier. The lower depth at approximately 12 feet is due to the RAS pump drawing down the sludge and the use of a cylinder near the surface that directs the influent flow down and outwards. The settled sludge depth decreases with greater radial distance, which indicates that the rake arm is consolidating the settled sludge from the outer area towards the center. The rake arm rotates at a rate of one revolution every 20-60 minutes. Between rake passes, sludge is continuously settling on top of the sludge blanket.

The proper positioning of the WAS inlets is dependent on the proper characterization of the abundance of nitrifying bacteria in the top layer of the settled sludge. The use of molecular biology based methods, such as fluorescence in situ hybridizations (FISH) with probes targeting specific sequences of the 16S rRNA of targeted microbial population, is useful in determining the distribution of the nitrifying bacteria and Anammox bacteria in the newly settled sludge. Culture based methods may also be used to measure the specific rate of nitrification or anaerobic ammonium oxidation in the newly settled sludge. This characterization may also be done using lab-scale bioreactors that can be used to measure the specific rate of nitrification ((mg NOx/L-hr)/g VSS)) or specific rate of anaerobic ammonium oxidation ((mg $NH_4^+$/L-hr)/g VSS)). Once the zone of newly settled sludge with minimal or no nitrifying bacteria or Anammox bacteria is identified, then a selective wasting system can be employed.

Figure 3:
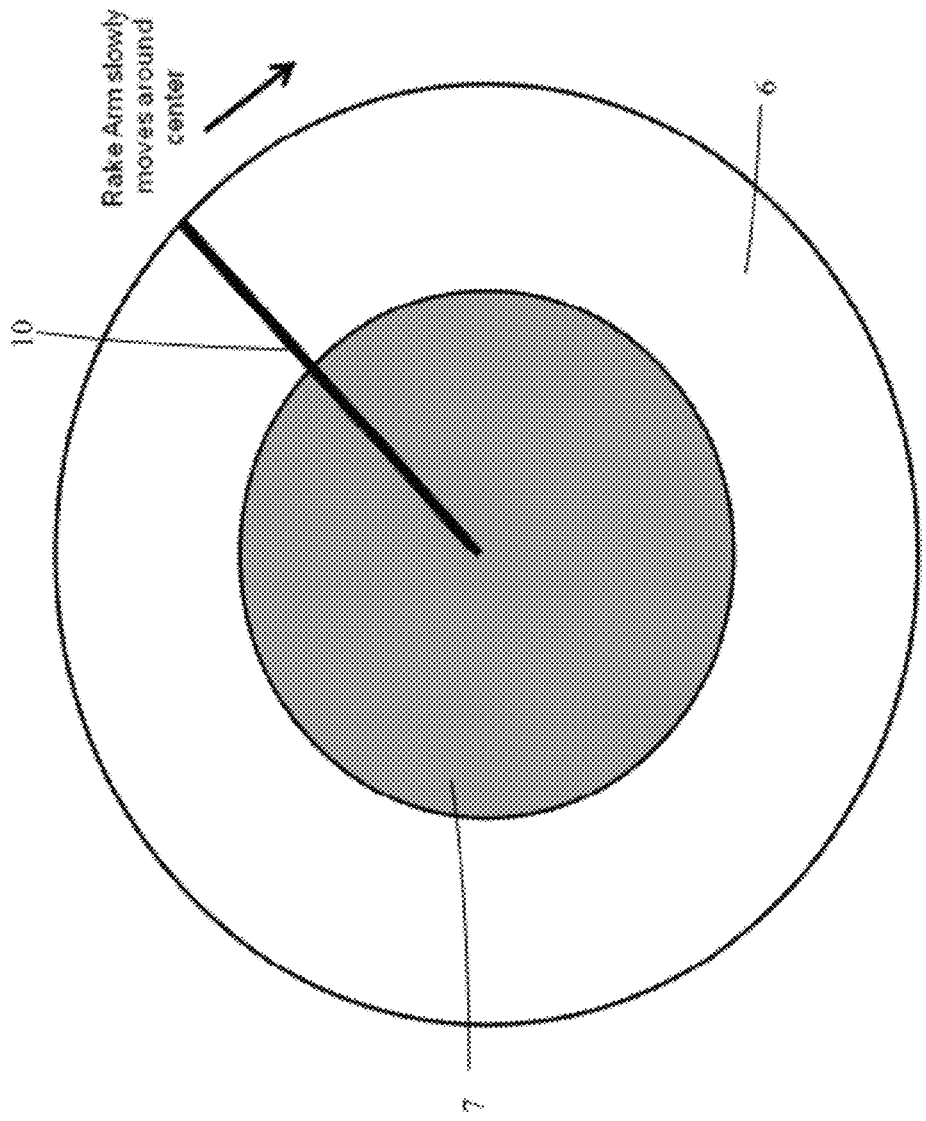
FIG. 3 is an illustration showing the top view of a traditional secondary clarifier. The top view of a circular clarifier shows a rake arm that rotates slowly about the center and two areas (white and gray) with newly settled sludges consisting of different levels of nitrifying bacteria. The gray area has sludge dominated by heterotrophic bacteria, while the white area has a mixture of both heterotrophic and nitrifying bacteria, respectively.
Figure 4:
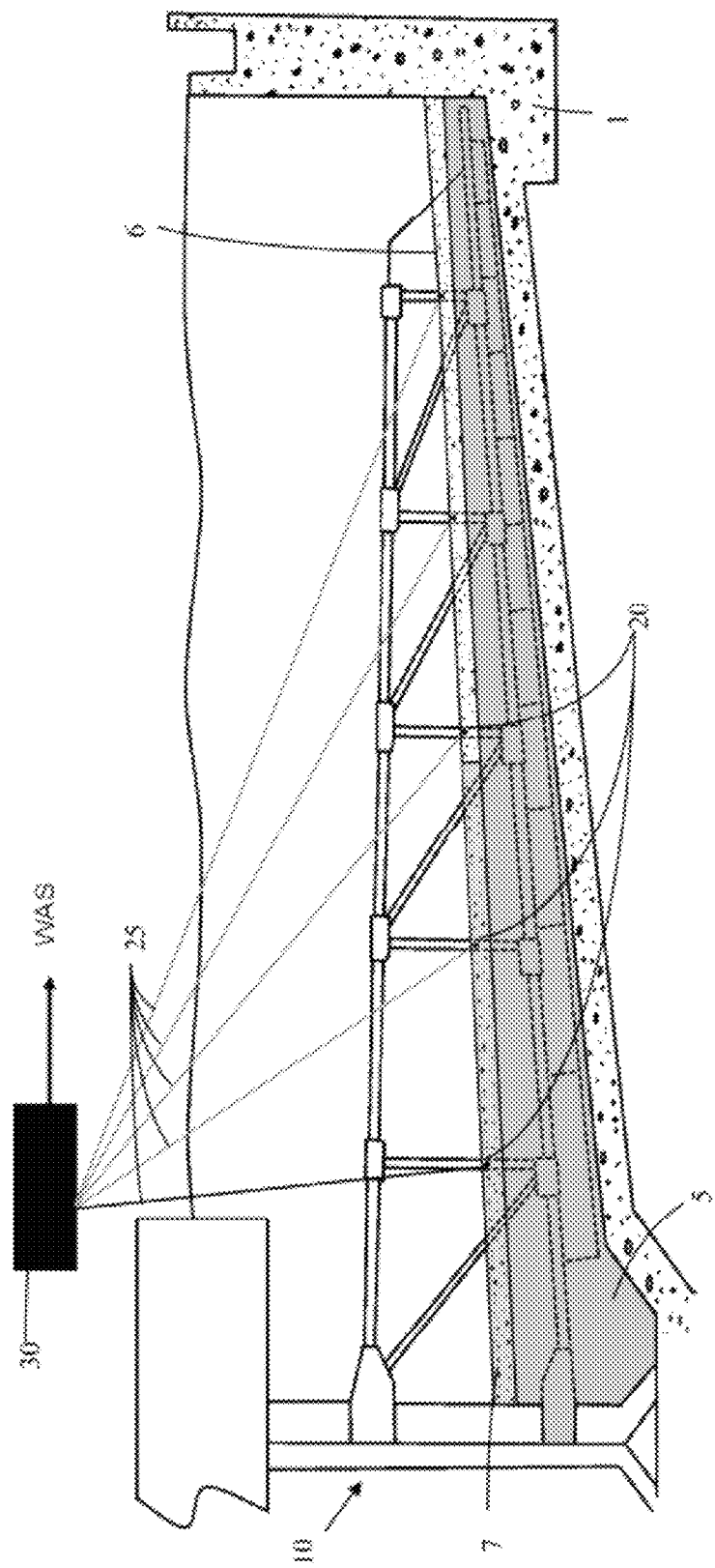
FIG. 4 is an illustration showing the side view of the secondary clarifier depicted in FIG. 3 with the rake retrofitted with new equipment to selectively waste the newly settled sludge that is dominated by heterotrophic bacteria. The sludge blanket is the dark gray area with the white top layer indicating the location of the newly settled sludge with the nitrifying bacteria and light gray area indicating the location of the sludge with the non-nitrifying bacteria. The black line from the WAS pump is the actual WAS line in this example, while the light gray lines are not collecting sludge.

The distribution of the nitrifying bacteria and Anammox bacteria is located on the surface layer of the settled sludge is non-homogeneous and that a properly positioned WAS inlet selectively waste sludge that does not contain any nitrifying bacteria, as seen in FIGS. 3 and 4. In traditional circular clarifiers, rake 10 is connected to a drive system, allowing the rake to move in a circle, thereby collecting settled sludge from the clarifier, as seen in FIG. 3. Newly settled sludges consist of different levels of nitrifying bacteria, based on settling characteristics. Nitrifying bacteria and Anammox bacteria 6 were found to populate the outer portion of the clarifier along with heterotrophic bacteria, shown in white, while heterotrophic (non-nitrifying and Anammox bacteria) bacteria 7 dominate the inner portion of the clarifier, shown in gray.

A modified rake may be used to selectively waste the newly settled sludge that is dominated by heterotrophic bacteria or collect the nitrifying bacteria and/or Anammox bacteria, as seen in FIG. 4. Sludge blanket 5 (dark gray area) collects in clarifier 1, and has a layer of heterotrophic (non-nitrifying and Anammox bacteria) bacteria 7 and a layer of nitrifying bacteria and Anammox bacteria 6. Negative pressure manifolds 20, which serve as selective intakes, are positioned on vertical rods across the rake arm and are adjustable vertically to ensure only the top layer of sludge is collected. Negative pressure manifolds 20 may be adjusted vertically using a cylindrical sleeve attached to the rake's vertical arms, or by any means known in the art. Each negative pressure manifold 20 has its own bacteria collection tube 25 connected to a WAS line and controlled by control module 30. The control module may independently control the collection from each negative pressure manifold 20, as illustrated by the black collection tube 25 showing actual WAS collection, while the gray collection tube 25 lines are not pumping. Depending on the distribution of the nitrifying bacteria and Anammox bacteria, multiple collection tube 25 may be used to prevent the wasting (washout) of a critical microbial population necessary for settling. The direct pumping of the newly settled sludge with the nitrifying bacteria and Anammox bacteria facilitates immediate reintroduction into the RAS.

Figure 5:
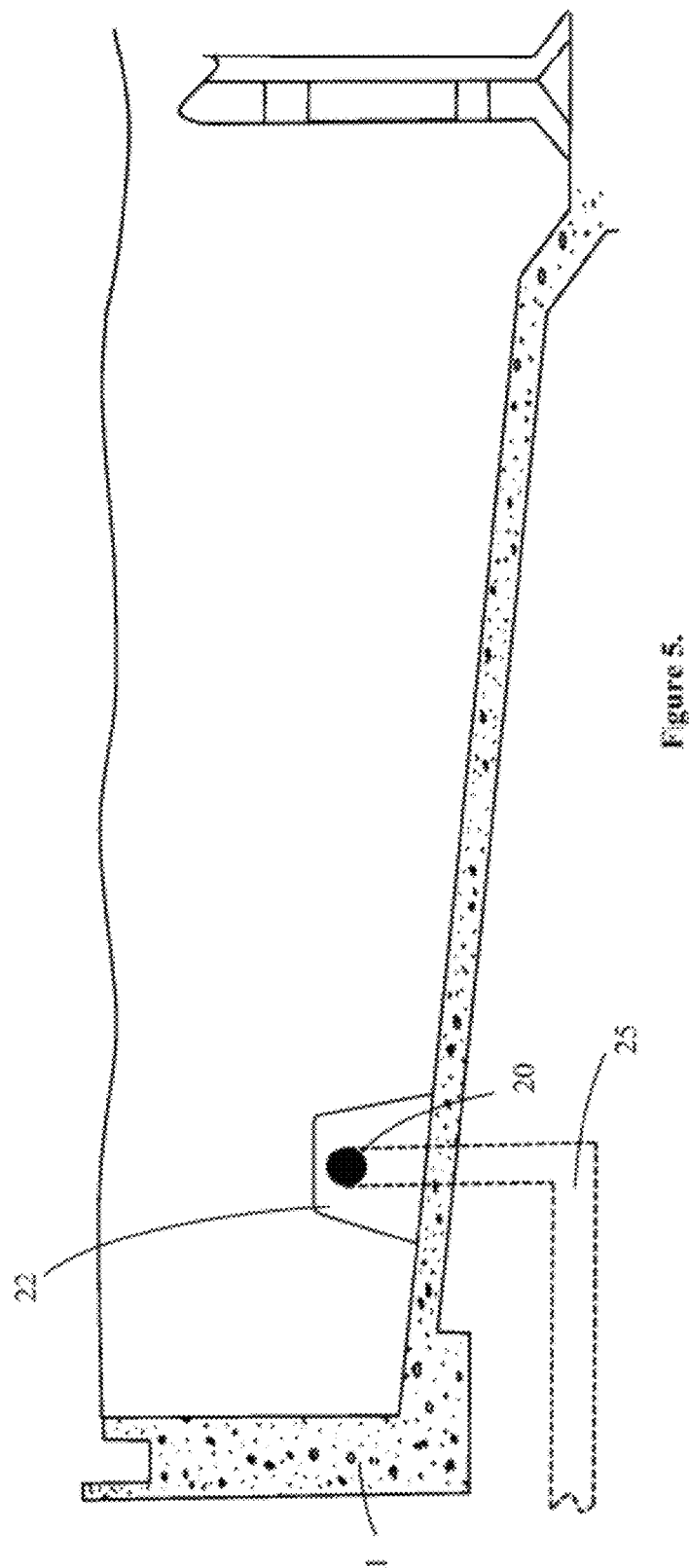
FIG. 5 is an illustration showing a side view of a secondary clarifier with a fixed selective wasting port. A rake designed to function with the fixed selective wasting port may include a notch in the scraper or a hinged scraper blade.
Figure 6:
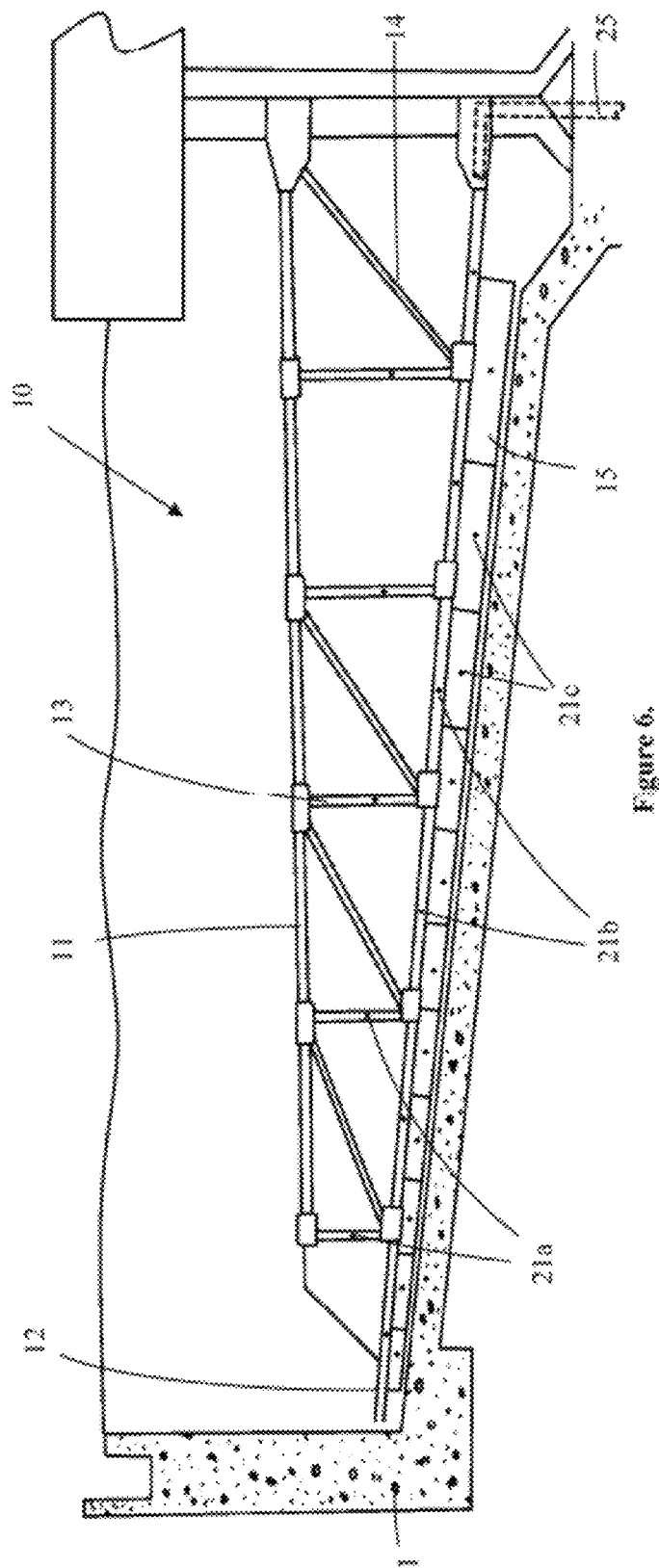
FIG. 6 is an illustration of a modified rake designed to collect heterotrophic bacteria or nitrifying bacteria.

The clarifier retrofit may include a negative pressure manifold, allowing selective collection of either the nitrifying bacteria for return to the aeration basins or selective collection of non-nitrifying bacteria for wasting. Likewise, this same retrofit may allow for selective collection of either the Anammox bacteria for return to the anaerobic or anoxic basins in advanced BNR systems (i.e., Modified Ludzack-Ettinger or Bardenpho 5-stage) or selective collection of non-Anammox bacteria for wasting. The collection occurs in secondary clarifier 1, after determining the settling location of the target bacteria (i.e., nitrifying bacteria, Anammox bacteria, or other bacteria of interest) in the clarifier. A WAS inlet may be at a fixed location, determined by the settling location of the different bacteria types, as seen in FIG. 5. The WAS inlet comprises housing 22 with a negative pressure manifold disposed adjacent to the bacteria settling location, allowing the bacteria to be collected. Housing 22 is positioned on the floor of the clarifier basin depending on the desired collection, either nitrifying bacteria and/or Anammox bacteria for collection and recirculation to the aeration or anaerobic/anoxic basin, respectively; or heterogeneous (non-nitrifying and/or non-Anammox) bacteria for wasting. The negative pressure manifold is coupled to a negative pressure system (not shown), such as a pump. Control module 30 triggers the activation of the negative pressure manifold by activating the negative pressure system or by activating a valve, such as a solenoid, causing negative pressure to build around the negative pressure manifold, causing bacteria around the manifold to be collected around negative pressure manifold 20 and transferred through bacteria collection tube 25 to an aeration and/ or anaerobic/anoxic basin, storage, or disposal. Where the retrofit includes rake 10 having negative pressure manifolds 20, rake 10 is fitted into secondary clarifier 1, as seen in FIG. 6. The rake consists of upper rake arm 11 connected to lower rake arm 12 by vertical supports 13 and diagonal supports 14. Negative pressure manifolds 20 are disposed on rake 10 to allow for selective collection of bacteria. Thus, the negative pressure manifolds may be upper selective inputs 21a, disposed on vertical supports 13, midline selective inputs 21b, disposed on lower rake arm 12, lower selective inputs 21c, disposed on rake blades 15, or a combination thereof. Where multiple selective inputs are used, each input is preferably independently connected to the negative pressure system, allowing control module 30 to independently activate each selective input. This permits a user to define bacteria collection locations without changing the rake. It is also preferable for the selective inputs to be tied into a valve or solenoid system, allowing the control module to apply negative pressure to multiple selective inputs, as designated by a user, while keeping the remaining, non-designated selective inputs at ambient pressure, i.e. inactive. It is noted that other rake systems may be retrofitted with the selective inputs, as disclosed herein. This disclosure is not meant to limit the scope of the invention to other rake systems.

Additionally, the SRT of the heterotrophic, Anammox, and nitrifying bacteria may be uncoupled using bioaugmentation to provide a small fraction of heterotrophic bacteria, such as phosphorus accumulating organisms (PAO), with distinct settling properties. Bioaugmentation can be carried out with a pure or mixed culture that is added directly to the aeration basin, and may include a biodegradable or non-biodegradable media with cells attached that settles in discrete locations in the secondary clarifier. The biodegradable or non-biodegradable media are used to promote biofilm formation on these small particles. Exemplary biodegradable medium includes kenaf product from RF Wastewater (Raleigh, N.C.), while exemplary non-biodegradable medium includes powder or granular activated carbon (PAC or GAC), or plastic medium. This culture would consume a portion of the BOD in either the anoxic or aeration basin and be easily separated from the settled sludge due to lack of incorporation into existing flocs.

A comparison of the $X_{nitrifying\ bacteria}$ in the aeration basin for a range of SRT is possible by using typical values for a BNR System, seen in Table 1.

TABLE 1

Typical operational characteristics for a BNR System.

| | | |
|---|---|---|
| SRT | Solids Retention Time | 10 days |
| HRT | Hydraulic Retention Time | 0.2 days |
| Y | Yield | 0.12 mg cells/mg N |
| $S_o$ | Influent Ammonia Concentration | 10 mg Ammonia-N/L |
| S | Effluent Ammonia Concentration | 0 mg Ammonia-N/L |
| $k_d$ | Decay Coefficient for Nitrifying Bacteria | 0.08 mg VSS/mg VSS-day |

For SRT=10 days:

$$a.\ X_{nitrifying\ bacteria} = (10/0.2) \cdot [(0.12 \cdot (10-0)/(1+(0.08) \cdot 10)] = 33.3\ mg/L \quad (9)$$

As the $SRT_{nitrifying\ bacteria}$ increases due to elimination of the wasting of the nitrifying bacteria, the nitrifying bacteria concentration in the aeration basin increases, as seen in Table 2.

TABLE 2

SRT data from reducing nitrifying bacteria wasting.

| $SRT_{nitrifying\ bacteria}$ (days) | Nitrifying Bacteria in Aeration Basin (mg/L) | % increase |
|---|---|---|
| 10 | 33.3 | 0% |
| 20 | 46.2 | 38% |
| 40 | 57.1 | 71% |
| 60 | 62.1 | 86% |
| 80 | 64.9 | 95% |
| 100 | 66.7 | 100% |
| 200 | 70.6 | 112% |
| 500 | 73.2 | 120% |
| 1,000 | 74.1 | 122% |
| 2,000 | 74.5 | 124% |
| 5,000 | 74.8 | 124% |
| 10,000 | 74.9 | 125% |

Reducing the wasting of nitrifying bacteria may be applied to a conventional activated sludge system designed for BOD removal (SRT=5 days). Selectively collecting nitrifying bacteria using a selective return rake, seen in FIGS. 4 and 6, improves the nitrifying bacteria concentration in the aeration basin further, seen in Table 3.

TABLE 3

SRT data from decreasing nitrifying bacteria wasting in a conventional activated sludge system.

| $SRT_{nitrifying\ bacteria}$ (days) | Nitrifying Bacteria in Aeration Basin (mg/L) | % increase |
|---|---|---|
| 5 | 21.4 | 0% |
| 20 | 46.2 | 115% |
| 40 | 57.1 | 167% |
| 60 | 62.1 | 190% |
| 80 | 64.9 | 203% |
| 100 | 66.7 | 211% |
| 200 | 70.6 | 229% |
| 500 | 73.2 | 241% |
| 1,000 | 74.1 | 246% |
| 2,000 | 74.5 | 248% |
| 5,000 | 74.8 | 249% |
| 10,000 | 74.9 | 250% |

Example 2

Water Reclamation Facility

Figure 7:
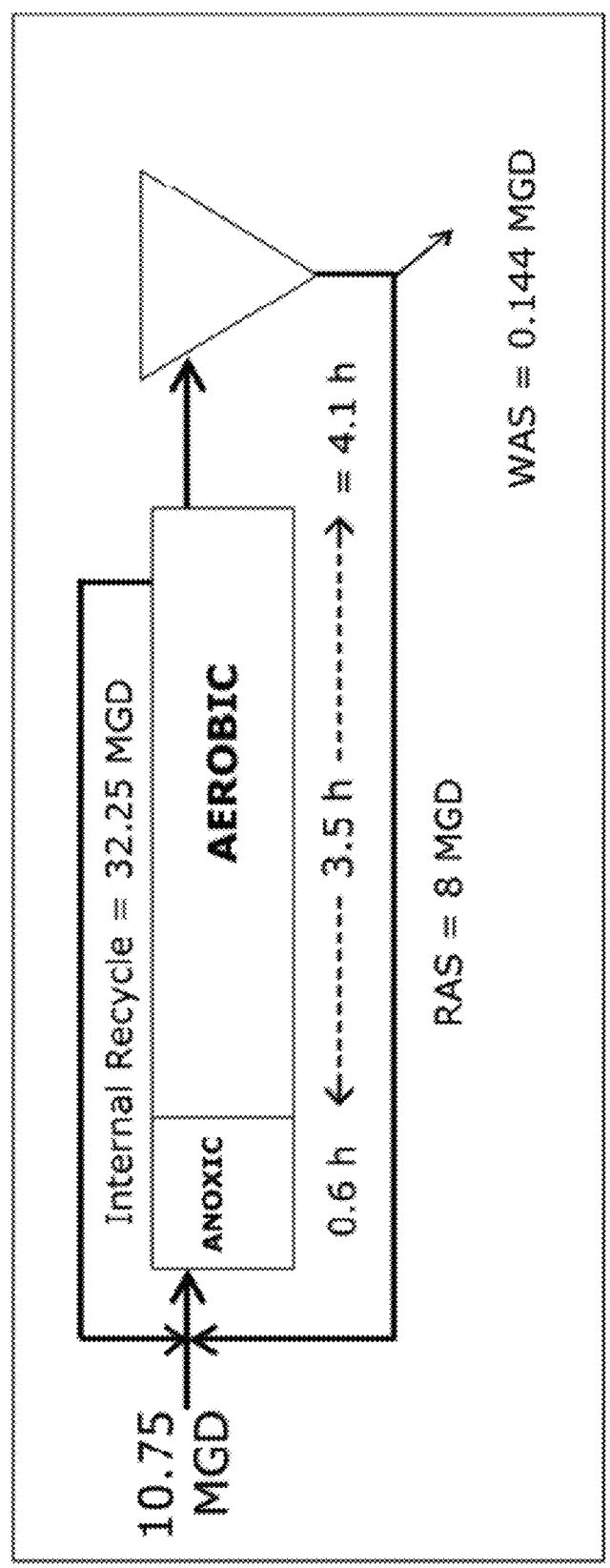
FIG. 7 is a basic schematic of the SCB WRF South Basin utilizing the MLE Process.

The South Cross Bayou Water Reclamation Facility (SCB WRF) utilizes the Modified Ludzack-Ettinger (MLE) Process for nitrogen control, seen in FIG. 7. In this common biological nitrogen removal system, the carbonaceous biochemical oxygen demand (cBOD) and ammonium rich wastewater enters into the anoxic zone with the internal recycle flow, which is rich in nitrate. In the anoxic zone, minimal aeration is provided to promote mixing and negligible dissolved oxygen. Under anoxic conditions, denitrification occurs and nitrate is converted to nitrogen gas. With nitrate removed, the wastewater still rich in cBOD and ammonium enters into the aeration basin for cBOD conversion to $CO_2$ and ammonium conversion to nitrite and then nitrate by nitrification.

Figure 8:
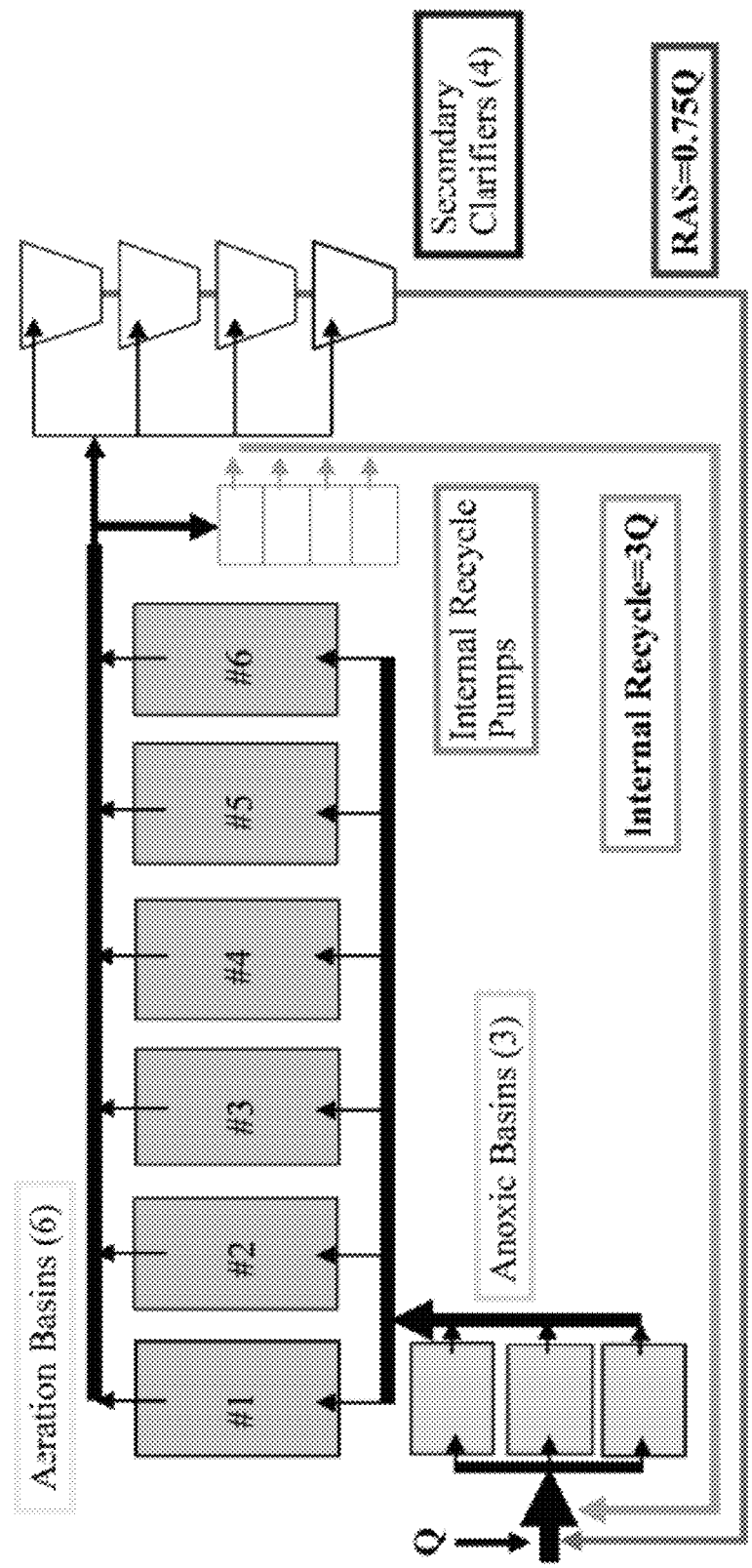
FIG. 8 is a schematic showing the SCB WRF system.

The SCB WRF South Basin is designed to treat 10.75 MGD (Q) and is comprised of 3 parallel anoxic tanks and 6 parallel aeration basins, seen in FIG. 8. The average MLVSS (X) is 2,450 mg/L.

Figure 9:
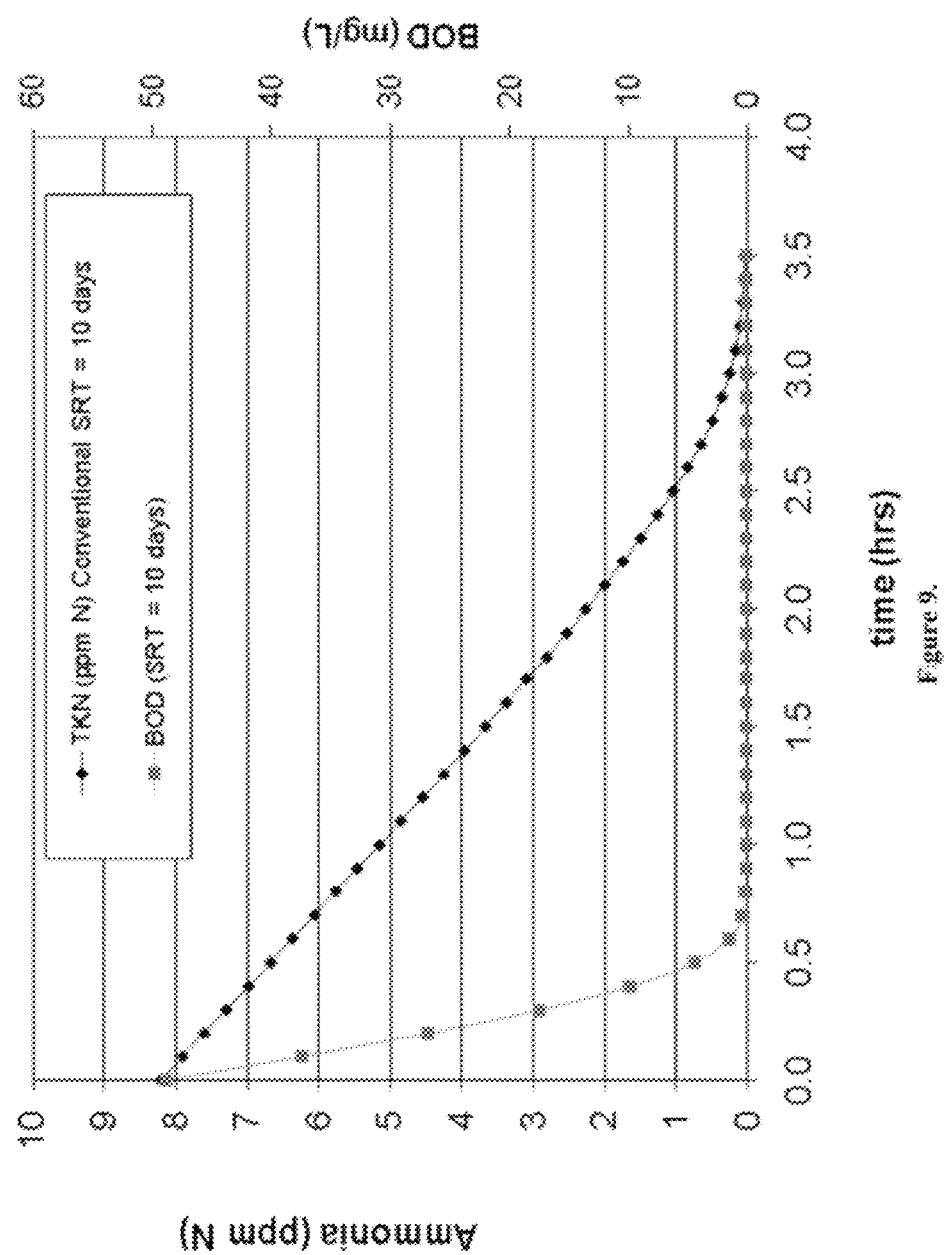
FIG. 9 is a graph showing BOD and ammonium profiles in the aeration basins of the SCB WRF South Basin.

The BOD and ammonium profiles can be determined for the average flow rate and wastewater characteristics, biomass concentrations of heterotrophic and nitrifying bacteria based on SRT, and the typical growth kinetics for both bacterial populations, seen in FIG. 9. Although the Anammox bacteria exhibit an uneven distribution in the secondary clarifier that is similar to the nitrifying bacteria, they are omitted from this example because of lack of information regarding growth kinetics. The bulk of the BOD is removed within the first half hour in the aeration basin, while the ammonium is removed below 1 mg/L in 2.5 hours.

Figure 10:
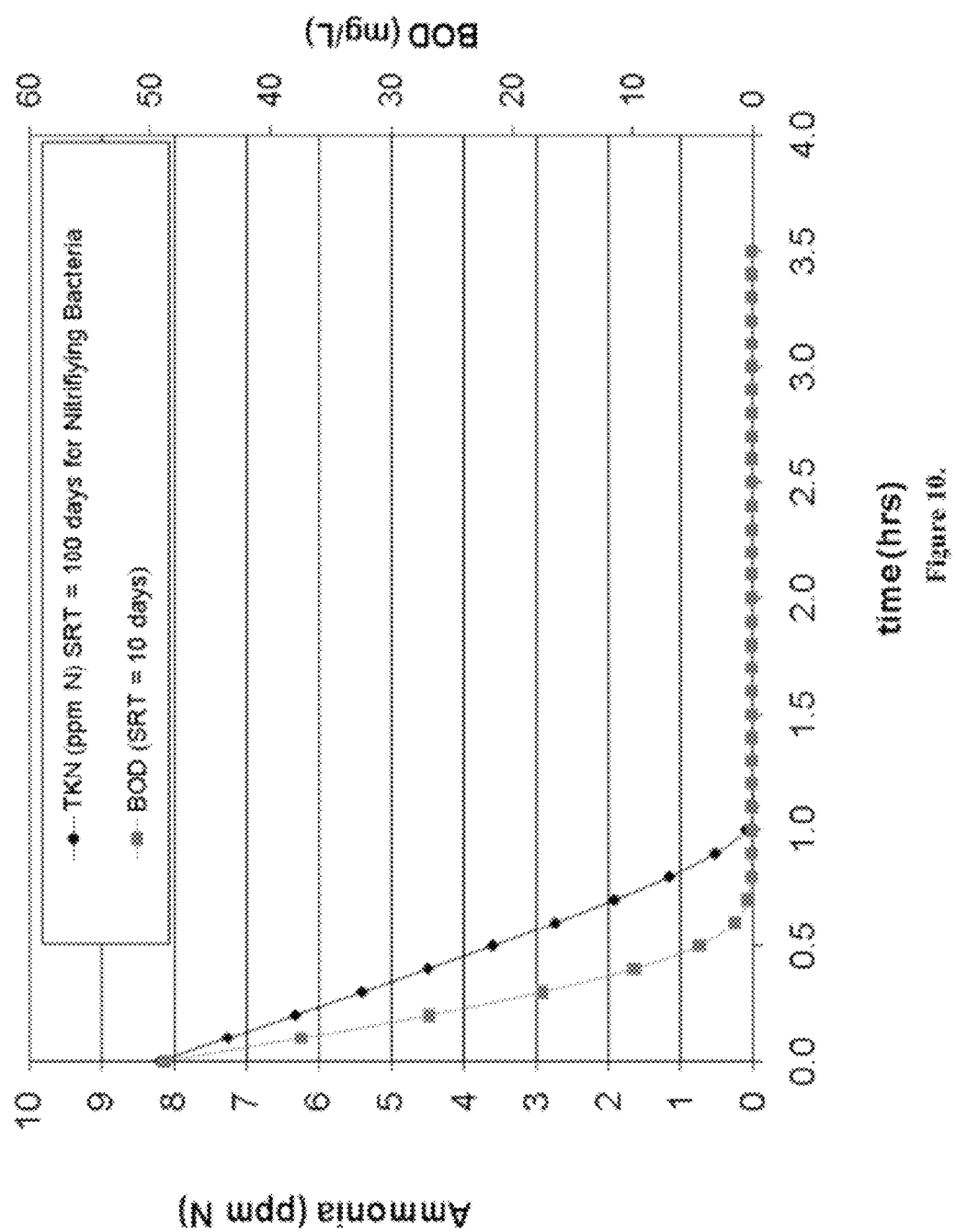
FIG. 10 is a graph showing BOD and ammonium profiles in the aeration basins of the SCB WRF South Basin with Uncoupled SRT.

Retrofitting the SCB WRF to uncouple the SRT for both bacterial populations (i.e., selective wasting of heterotrophic bacteria), results in dramatic changes to the BOD and ammonium profiles in the aeration basins, as seen in FIG. 10. BOD and ammonium removal is achieved within 1 hour. This approach significantly reduces the HRT needed for BOD and Ammonia removal in the aeration basin.

Example 3

Identifying Bacterial Populations and Settling Zones

Sludge samples were collected from the secondary clarifiers of three distinct biological nutrient removal (BNR) systems in the Tampa metro region, as seen in Table 4, and preserved for future FISH analysis. For each POTW, the rake system used to transfer the settled sludge to a pit for RAS and WAS pumping was disabled and wastewater continued to enter the secondary clarifiers for approximately one hour to ensure that there was sufficient freshly settled sludge deposited at the surface of the sludge blanket. Samples were collected from various distances from the inlet of both rectangular and circular clarifiers. For the HC AWTP High Purity $O_2$ System, the sludge samples were collected along the length of the secondary clarifier at distances of 10, 40, 55, 70, 85, 100, 140, 155, and 170 feet from the inlet. For the HC AWTP Nitrification System, the sludge samples were collected along the length of the secondary clarifier at distances of 10, 40, 55, 70, 85, 100, 140, 155, and 170 feet from the inlet. For the SCB WRF, the sludge samples were collected at radial distances of the secondary clarifier at 8, 13, 18, 23, 28, 33, 38, 45, and 55 feet from the inlet. For the TS WTP, the sludge samples were collected at radial distances of the secondary clarifier at 5, 8.5, 10.5, 12.5, 15, 20, 25, 30, 32.5, and 37.5 feet from the inlet. After recording the sludge blanket thickness at each sampling location, a 0.3 mL sample was collected from the top one-inch layer of the sludge blanket and immediately preserved for future FISH analysis. All samples were preserved by the addition of 1 mL of 4% paraformaldehyde and storage at 4° C. overnight. Samples were centrifuged at 10,000×G for 5 minutes, the supernatant was decanted, and the resulting cell pellet was resuspended in 1 mL of ethanol:PBS. In some cases, samples were further diluted with ethanol:PBS in order to provide sufficient biomass for FISH analysis. The samples were stored at −20° C. until further analysis.

TABLE 4

Secondary clarifiers evaluated for two BNR systems in west-central Florida.

| POTW | BNR System | Secondary Clarifier | BNR System Influent Pretreatment |
|---|---|---|---|
| Howard F. Curren Advanced Wastewater Treatment Plant (HC AWTP) | High Purity $O_2$ System | Rectangular | Primary Clarifier & cBOD removal by High Purity $O_2$ system |
|  | Nitrification System | Rectangular |  |
| South Cross Bayou Water Reclamation Facility (SCB WRF) | Modified Ludzack-Ettinger | Circular | Primary Clarifier |
| Tarpon Springs Wastewater Treatment Plant (TS WTP) | BardenPho 5-Stage | Circular | None |

Fluorescence In Situ Hybridizations

Fluorescently-labeled oligonucleotide probes targeting the 16S rRNA for the predominant AOB, NOB, Anammox bacteria, and *Acinetobacter* were synthesized and conjugated with the cyanine dye, Cy3, before purification with oligonucleotide probe purification cartridges, seen in Table 5 (Oerther, D. B., J. Pernthaler, et al. (2000). "Monitoring precursor 16S rRNAs of *Acinetobacter* spp. in activated sludge wastewater treatment systems." *Applied and Environmental Microbiology* 66(5): 2154-2165). Fluorescently labeled probes were diluted to 50 mg/L with RNase free $H_2O$, and stored in 50-L aliquots at −20° C. in the dark. Fixed samples were applied to a sample well on a 10 well Heavy Teflon Coated microscope slide (Cel-Line Associates, New Field, N.J.) and air-dried. After dehydration with an increasing ethanol series (50, 80, 100% [vol/vol] ethanol, 1 min each), each sample well was covered with a mixture of 27 μL of hybridization buffer with the appropriate formamide and salt concentration and 3 μL of the fluorescently labeled oligonucleotide probe (DelosReyes, F. L., W. Ritter, et al. (1997). "Group-specific small-subunit rRNA hybridization probes to characterize filamentous foaming in activated sludge systems." *Applied and Environmental Microbiology* 63(3): 1107-1117). Hybridizations were conducted in a moisture chamber for 1 h, in the dark, at 46° C. The slides were washed for 30 min at 48° C. with 50 mL of pre-warmed washing buffer solution (DelosReyes, F. L., W. Ritter, et al. (1997). "Group-specific small-subunit rRNA hybridization probes to characterize filamentous foaming in activated sludge systems." *Applied and Environmental Microbiology* 63(3): 1107-1117). Fixed, hybridized cells were mounted with Cargille immersion oil (Type FF, Cedar Grove, N.J.) and a cover slip. Cells were stained with ice cold 4',6-diamidino-2-phenylindole (DAPI) at a concentration of 1 μg/mL for 1 minute and rinsed with DI water.

TABLE 5

Cy3 labeled probes used for FISH analysis

| Probe |  | Specificity |
|---|---|---|
| AO | Nsm0156 | *Nitrosomonas* spp.,[1] *Nitrosococcus mobilis*[1] |
|  | Nsv0443 | *Nitrosospira* spp.[1] |

TABLE 5-continued

Cy3 labeled probes used for FISH analysis

| | Probe | Specificity |
|---|---|---|
| NOB | NIT3 | Nitrobacter spp.[2] |
| | Ntspa0712 | 56% of the members of the phylum Nitrospirae[3] |
| | NSR447 | Nitrospira spp.[4] |
| | Acin0659 | Acinetobacter spp.[5] |
| | Amx368 | Anammox bacteria[6] |

[1]Mobarry, B. K., M. Wagner, et al. (1996). "Phylogenetic probes for analyzing abundance and spatial organization of nitrifying bacteria." Appl Environ Microbiol 62(6): 2156-62
[2]Wagner, M., G. Rath, et al. (1996). "In situ analysis of nitrifying bacteria in sewage treatment plants." Water Science and Technology 34(1-2): 237-244
[3]Daims, H., J. L. Nielsen, et al. (2001). "In situ characterization of Nitrospira-like nitrite oxidizing bacteria active in wastewater treatment plants." Applied and Environmental Microbiology 67(11): 5273-5284
[4]Schramm, A., D. de Beer, et al. (1998). "Identification and activities in situ of Nitrosospira and Nitrospira spp. as dominant populations in a nitrifying fluidized bed reactor." Applied and Environmental Microbiology 64(9): 3480-3485
[5]Oerther, D. B., J. Pernthaler, et al. (2000). "Monitoring precursor 16S rRNAs of Acinetobacter spp. in activated sludge wastewater treatment systems." Applied and Environmental Microbiology 66(5): 2154-2165
[6]Schmid M., Walsh K., Webb R., Rijpstra W. I,, van de Pas-Schoonen K., Verbruggen M. J., Hill T., Moffett B., Fuerst J., Schouten S., Damsté J. S., Harris J., Shaw P., Jetten M., Strous M. (2003). "Candidatus "Scalindua brodae", sp. nov., Candidatus "Scalindua wagneri", sp. nov., two new species of anaerobic ammonium oxidizing bacteria." Syst Appl Microbiol. Nov; 26(4): 529-38.

Whole cell fluorescence was visualized with an upright epiflourescence microscope (Leitz DiaPlan, Heerbrugg, Switzerland) and 40× or 100× oil-immersion objectives. Digital images were captured using a Spot-FLEX charge coupled device (CCD) camera (Diagnostic Instruments, Inc., Sterling Heights, Mich.). DAPI and Cy3 digital images were collected with an exposure time of 1.5 and 0.8 sec, respectively. All digital images were either 8-bit or 12-bit and collected using a gain of 2.

FISH images were analyzed in a qualitative and semi-quantitative manner. For the HC AWTP samples, approximately 20 fields per sample were viewed and the estimated abundance was recorded. An average abundance was calculated for each sample. For the SCB WRF samples, 11-35 fields per sample were viewed and flocs were identified as small (~20 micron diameter), medium (~50 micron diameter), or large (~100 micron diameter). Abundance was estimated for each floc size and the overall abundance of the sample was calculated. The TS WTP samples exhibited large sized flocs and an even distribution, which negated the need to estimate abundance.

FISH Analysis of Freshly Settled Sludge from the Secondary Clarifier of the Nitrification System at the HC AWTP An uneven distribution of AOB, Nitrosospira and Nitrosomonas, was observed with the lighter fraction (i.e., sludge collected furthest from the inlet) exhibiting elevated levels of both. The Nitrosospira appears to be the dominant AOB present in this activated sludge system. Near the inlet (10 ft), low levels of Nitrosospira were present in 10% of the flocs, seen in FIGS. 11(A) and 12.

Samples beyond 40 ft from the inlet had flocs with 10-100% abundance of Nitrosospira. High levels (90-100%) of the Nitrosospira were observed in approximately 10% of the flocs in samples collected from 40 and 85 ft from the inlet. However, samples collected from 55, 70, and 100 ft from the inlet had flocs with 10-30% abundance of Nitrosospira, but only 5-10% of the flocs had Nitrosospira. At 140, 155, and 170 ft from the inlet, 30-85% of the flocs contained Nitrosospira with levels of 80-90%, seen in FIG. 11(A) and (B). Interestingly, very small clusters of Nitrosospira were present, which suggests that these large clusters of Nitrosospira present in the flocs may be very sensitive to shear. The brief mixing of the samples by vortex may be enough to disrupt these flocs.

Figure 11:
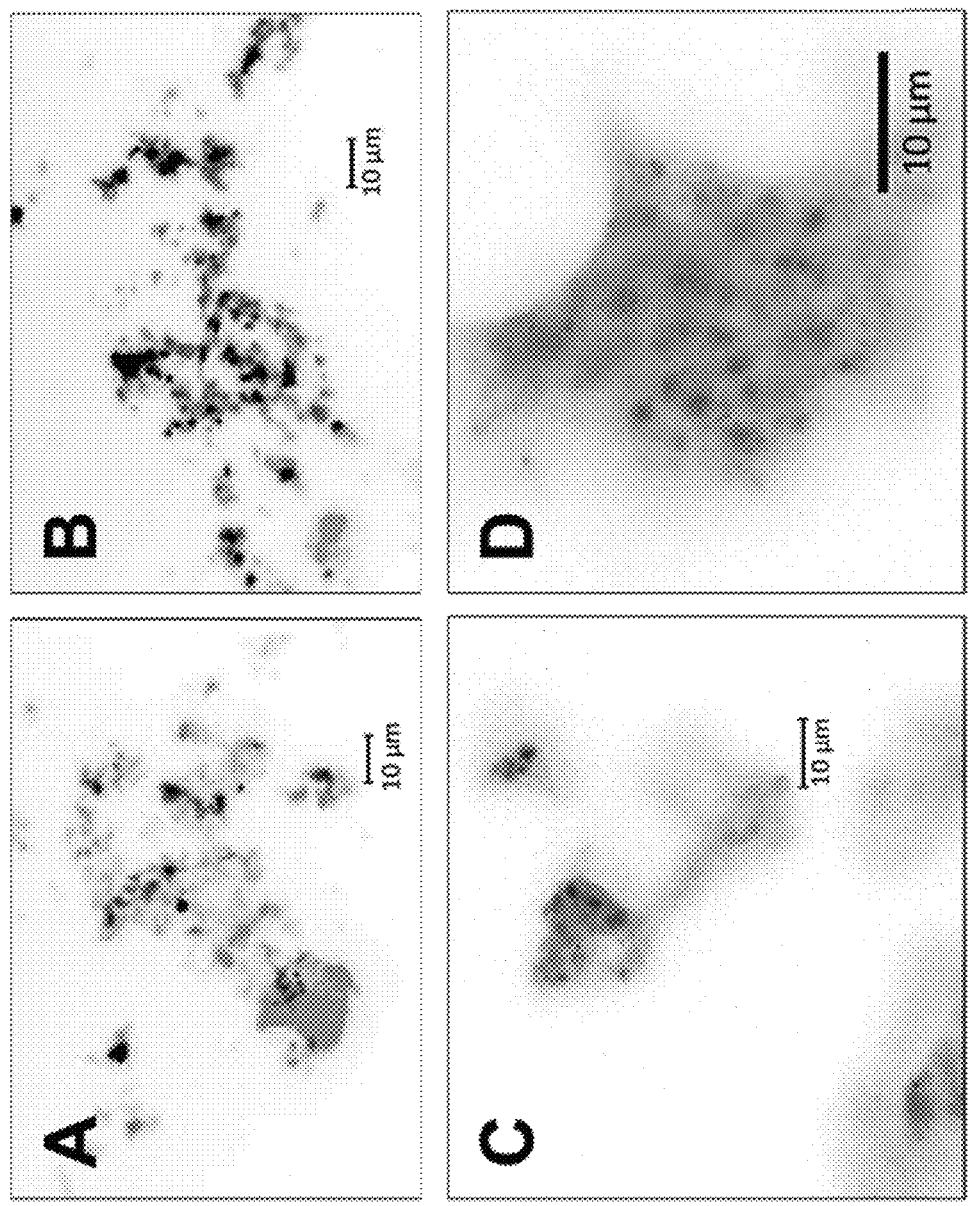
FIGS. 11(A)-(D) are representative FISH images of the AOB Nitrosospira (A and B; black/dark gray) and Nitrosomonas (C and D; black/dark gray) in samples collected from freshly settled sludge from influent (C), 10 ft (A), 155 ft (B,D) from the inlet of the secondary clarifier of the Nitrification System of the HC AWTP. Flocs are DAPI stained (light gray).
Figure 12:
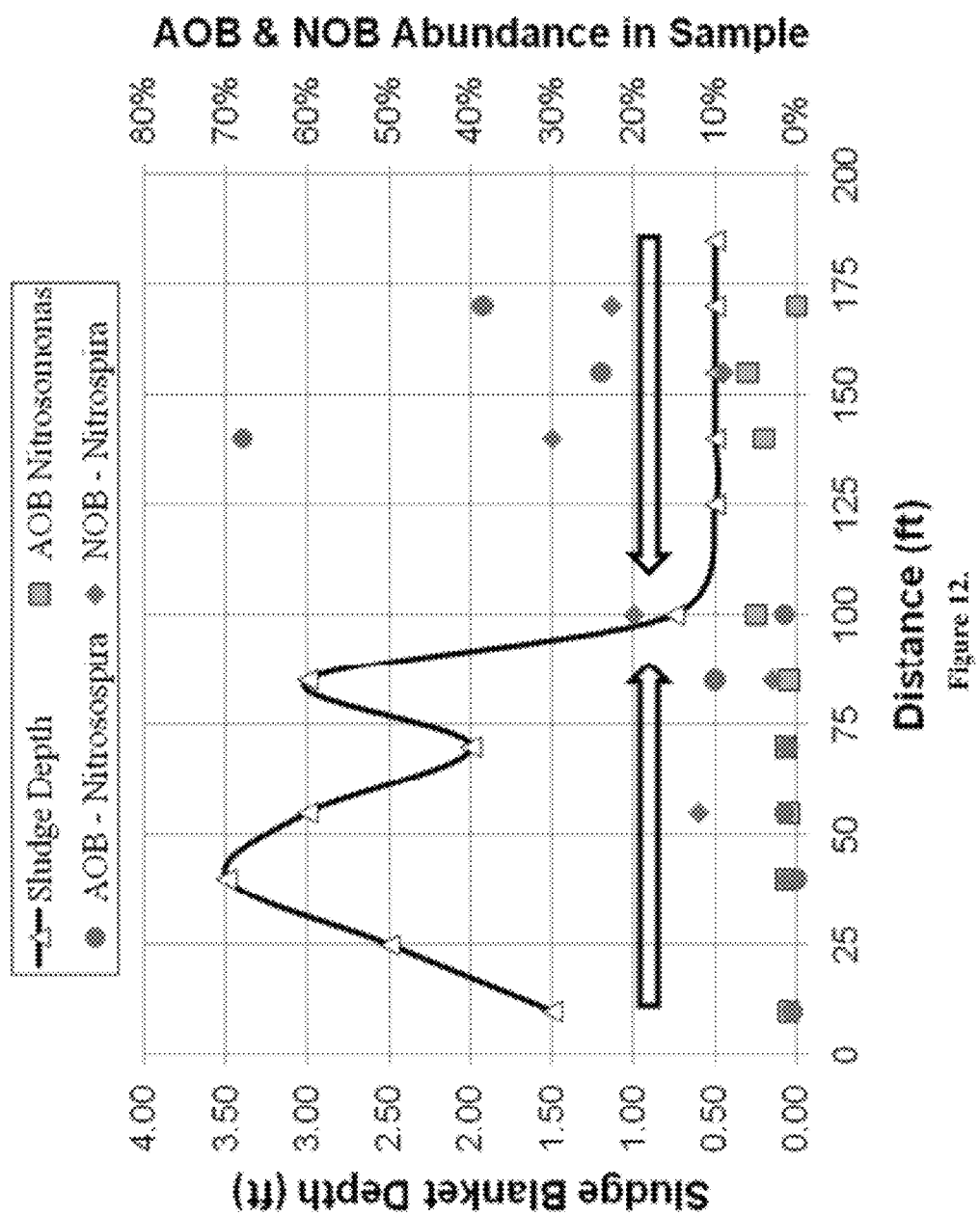
FIG. 12 is a graph showing the sludge depth and estimated % of total biomass of Nitrosospira, Nitrosomonas, and Nitrospira in freshly collected settled sludge of the Nitrification System of the HC AWTP. The arrows indicate the direction of the rakes used to transfer the settled sludge to a central channel for RAS+WAS pumping.

Approximately 30% of the small flocs (15-20 μm diameter) in the sample collected from 155 ft from the clarifier influent consisted of high levels of Nitrosomonas, as seen in FIG. 11(C) and (D). Some of the large flocs in the clarifier influent had microcolonies of Nitrosomonas near the outer surface with similar dimensions compared to the flocs observed in the sample collected at 155 ft from the clarifier influent, seen in FIG. 11(A). The fluorescence from the clusters of Nitrosomonas were dimmer compared to Nitrospira clusters, which may indicate slower specific growth rate of the Nitrosomonas relative to the Nitrospira (DeLong, E. F., G. S. Wickham, et al. (1989). "Phylogenetic stains: ribosomal RNA-based probes for the identification of single cells." Science 243(4896): 1360-3).

Figure 13:
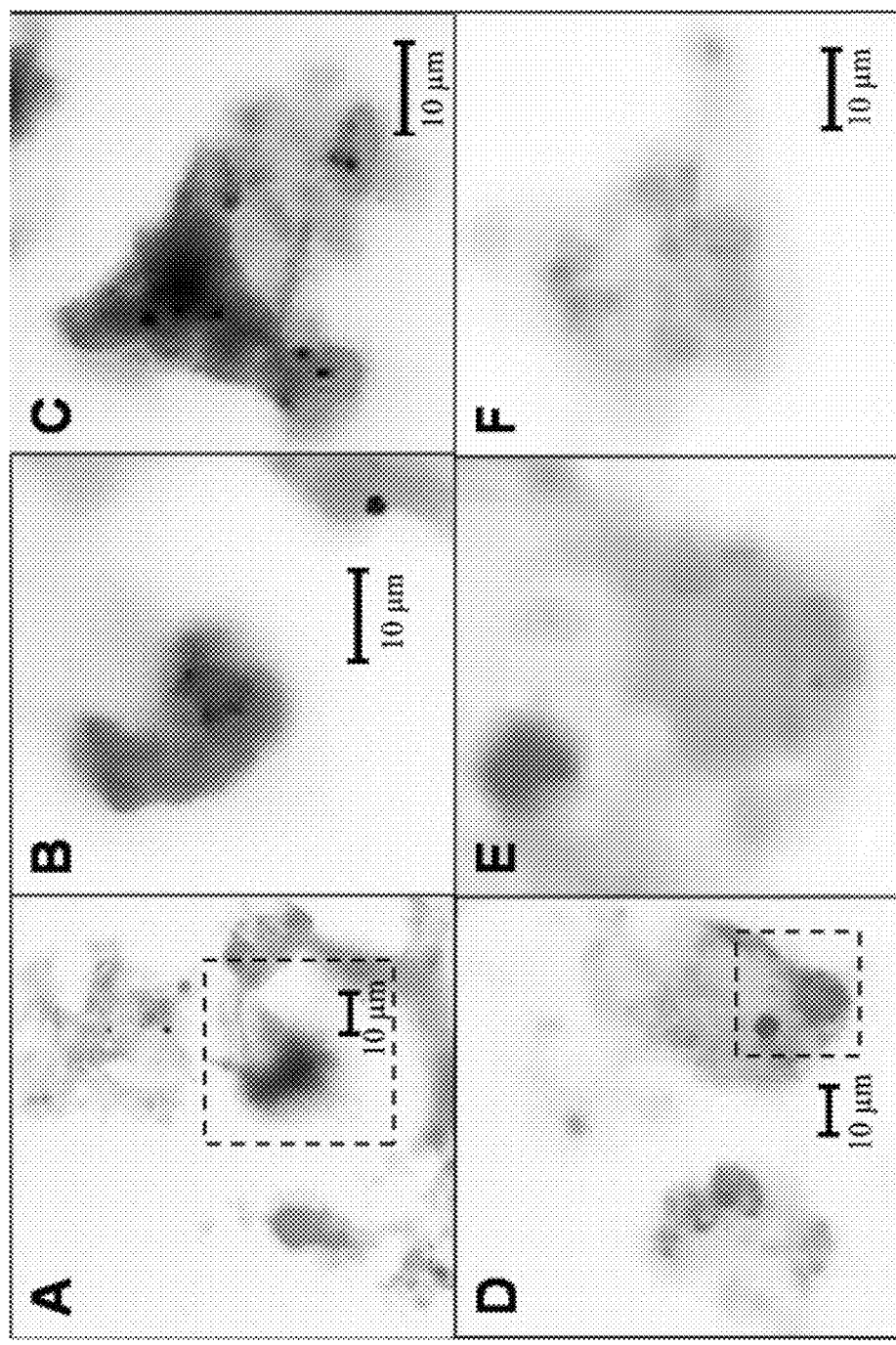
FIGS. 13(A) through (F) are representative FISH images of the NOB Nitrobacter (black/dark gray; A-C) and Nitrospira (black/dark gray; D-F) in samples collected from freshly settled sludge from 10 ft (D), 40 ft (D, E), 140 ft (A, B, F), and 155 ft (C) from the inlet of the secondary clarifier of the Nitrification System of the HC AWTP. Images B and E are magnified images of Images A and D (dashed line box). Image B is a different focal plane compared to Image A. All flocs are DAPI stained (light gray).
Figure 14:
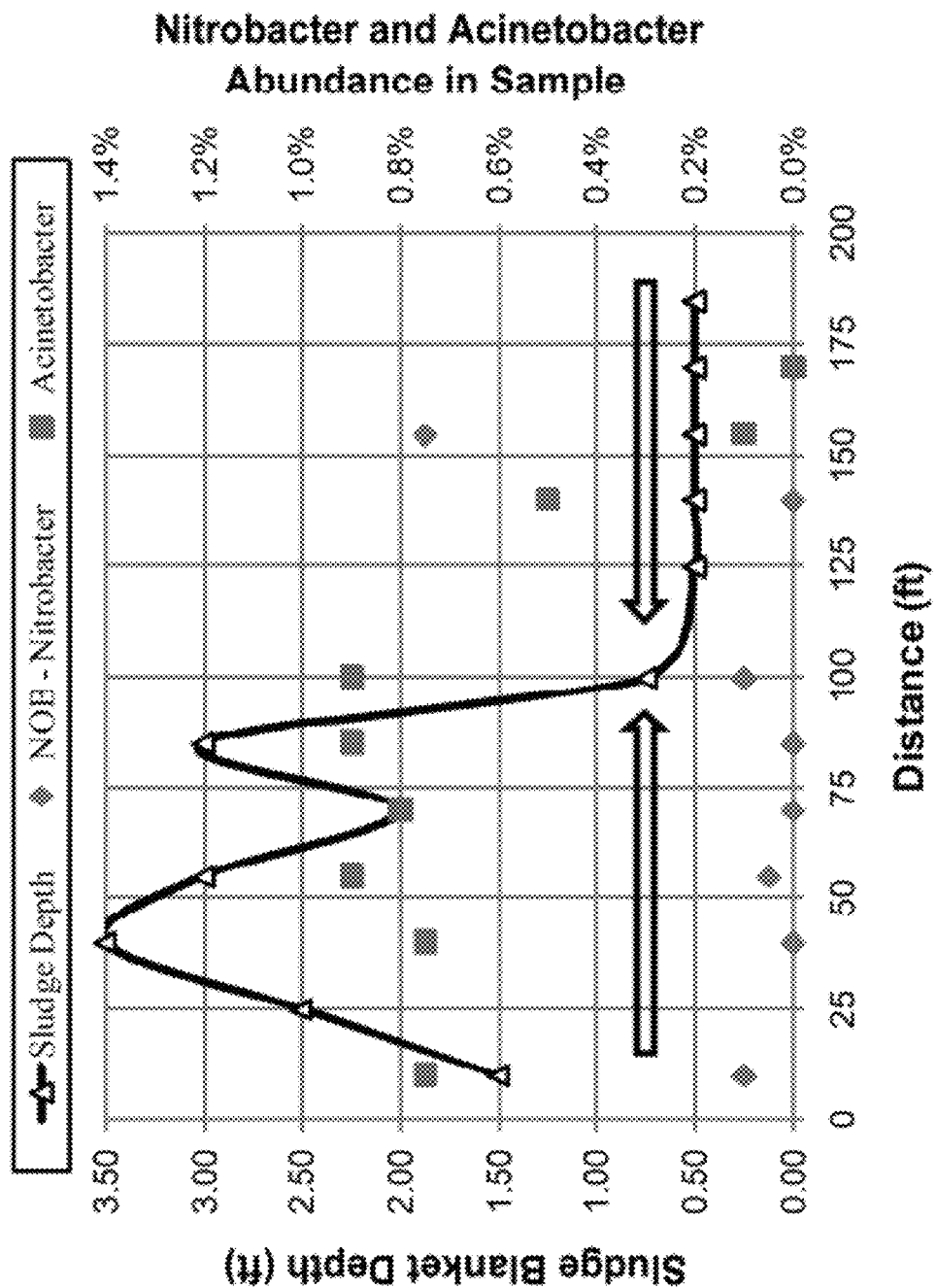
FIG. 14 is a graph showing the sludge depth (Δ) and estimated % of total biomass of Nitrobacter and Acinetobacter in freshly collected settled sludge of the Nitrification System of the HC AWTP. The arrows indicate the direction of the rakes used to transfer the settled sludge to a central channel for RAS+WAS pumping.

FISH analysis revealed the presence of Nitrobacter cells in four of the samples collected (10, 55, 100, and 155 ft). Very low levels of Nitrobacter cells were detected in the samples collected from 10 and 55 feet. A cluster of Nitrobacter cells was detected in a much larger floc from the sample collected at 100 ft, seen in FIGS. 13(A) and (B). Several small clusters of Nitrobacter cells were detected in some of the flocs from the sample collected from 155 ft revealed, seen in FIG. 13(C), but only accounted for 0.8% of the overall abundance, as seen in FIG. 14. With the Ntspa0712 probe, a cluster of Nitrospira-like cells was detected in a single floc from the sample collected at 140 ft. According to probeBase (Loy, A., F. Maixner, et al. (2007). "probeBase—an online resource for rRNA-targeted oligonucleotide probes: new features 2007." Nucleic Acids Res. 35: D800-D804), the Ntspa0712 probe only targets 56% of the phylum Nitrospirae, which may explain the low abundance (Daims, H., J. L. Nielsen, et al. (2001). "In situ characterization of Nitrospira-like nitrite oxidizing bacteria active in wastewater treatment plants." Applied and Environmental Microbiology 67(11): 5273-5284). A second attempt using the NSR447 probe was more successful in identifying and enumerating the Nitrospira. The abundance of Nitrospira reached a maximum of 30% in sludge settling at 140 ft. In general, the high levels of Nitrospira were observed in the sludge settling in the second half of the clarifier, but the sludge settling at 55 ft had more than 10%. In summary, there appears to be an uneven distribution of the major nitrifying bacteria populations in the secondary clarifier with the rapidly settling sludge consisting of very low levels of nitrifying bacteria. Additional FISH work revealed an uneven distribution of Anammox bacteria that resembled the nitrifying bacteria.

Figure 15:
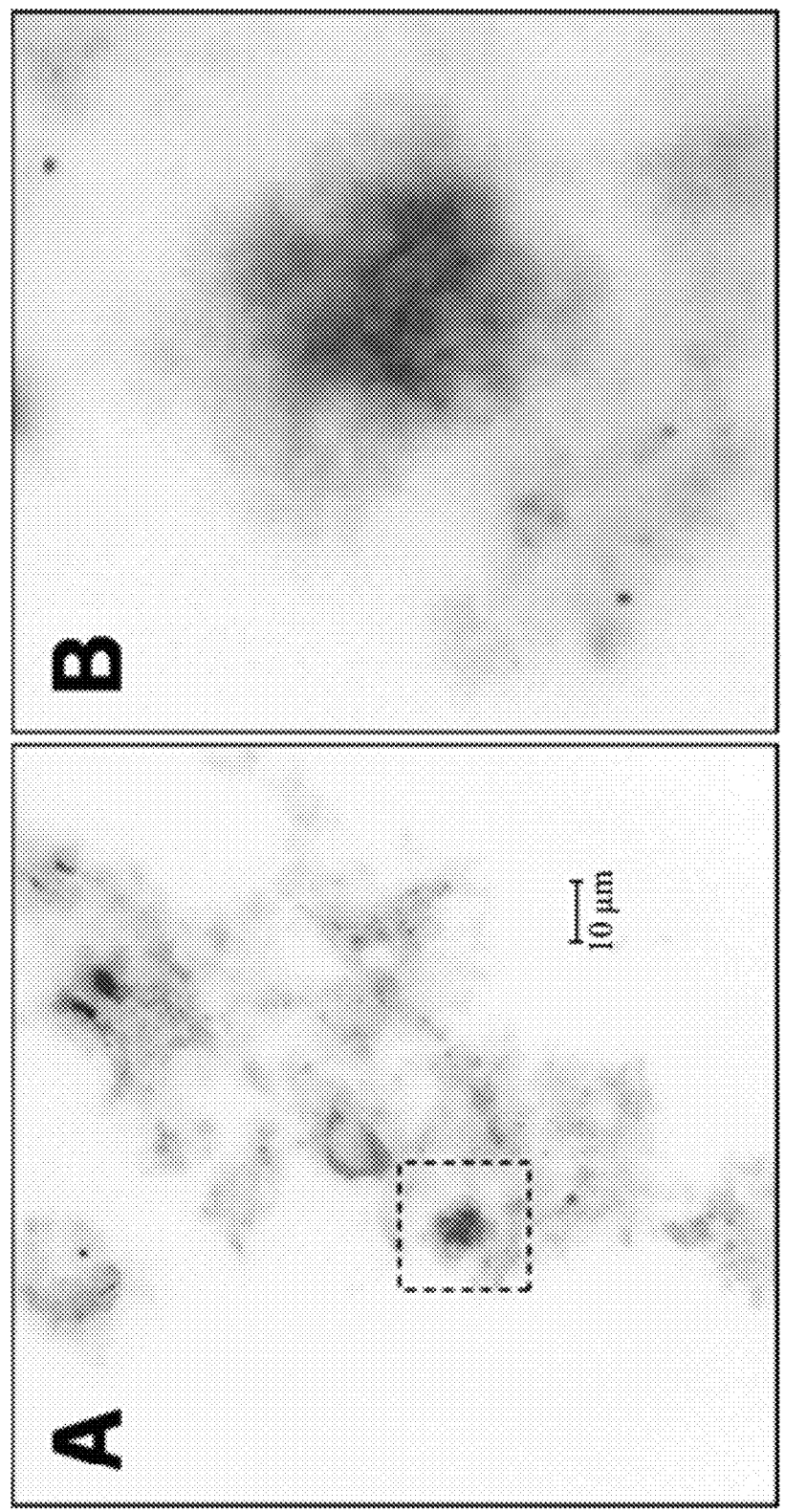
FIGS. 15(A) and (B) are representative FISH images of the AOB Nitrosomonas (A and B; black/dark gray) in samples collected from freshly settled sludge from 8 ft from the inlet of the secondary clarifier of the SCB WRF. Image B is higher magnification images of A (dashed boxes). Flocs are DAPI stained (light gray). Size bars are 10 microns.
Figure 16:
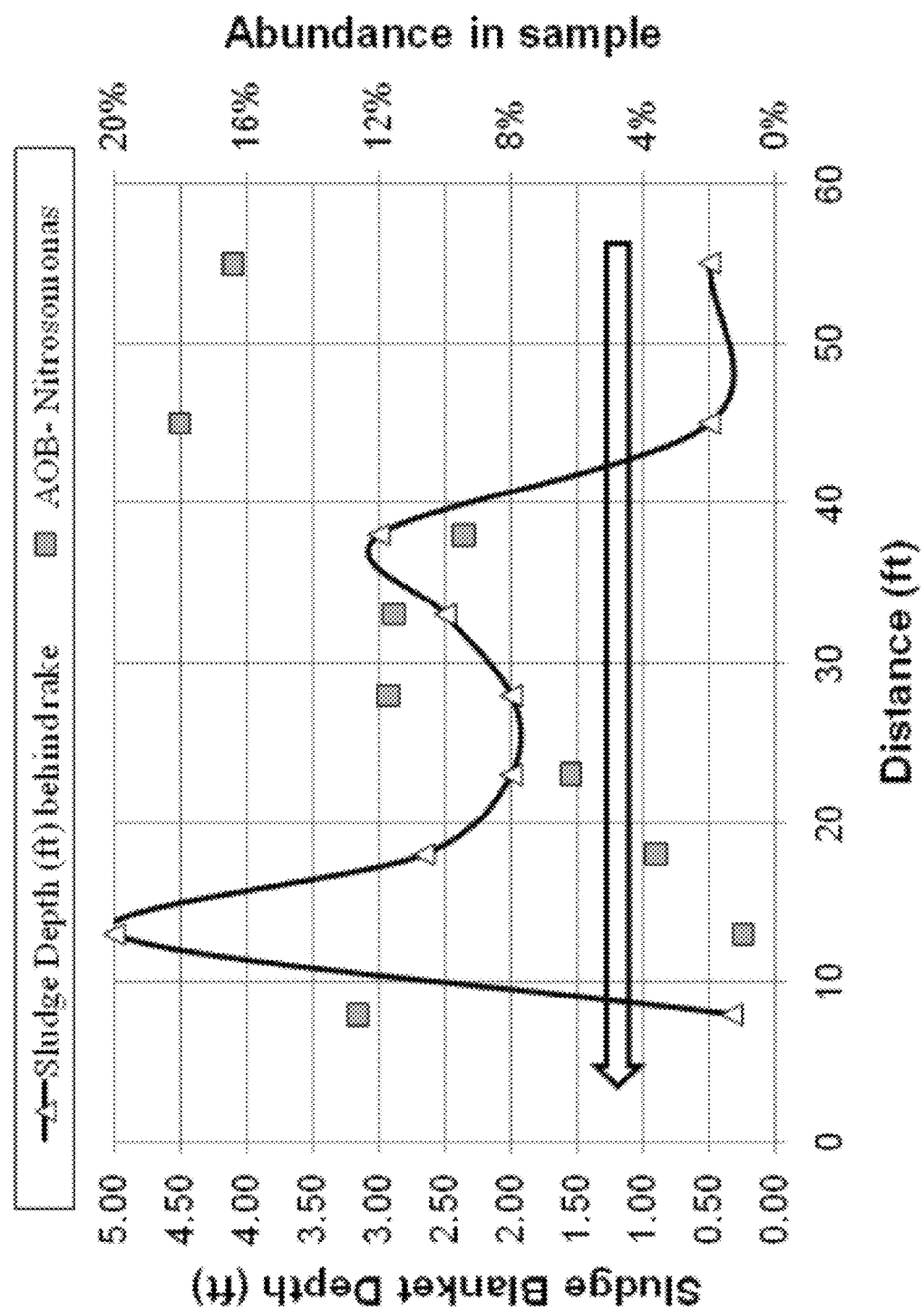
FIG. 16 is a graph showing the sludge depth and estimated % of total biomass of Nitrosomonas in freshly collected settled sludge of the MLE System of the SCB WRF. The arrow indicates the direction of the rake used to transfer the settled sludge to a central sludge pit for RAS+WAS pumping.
Figure 17:
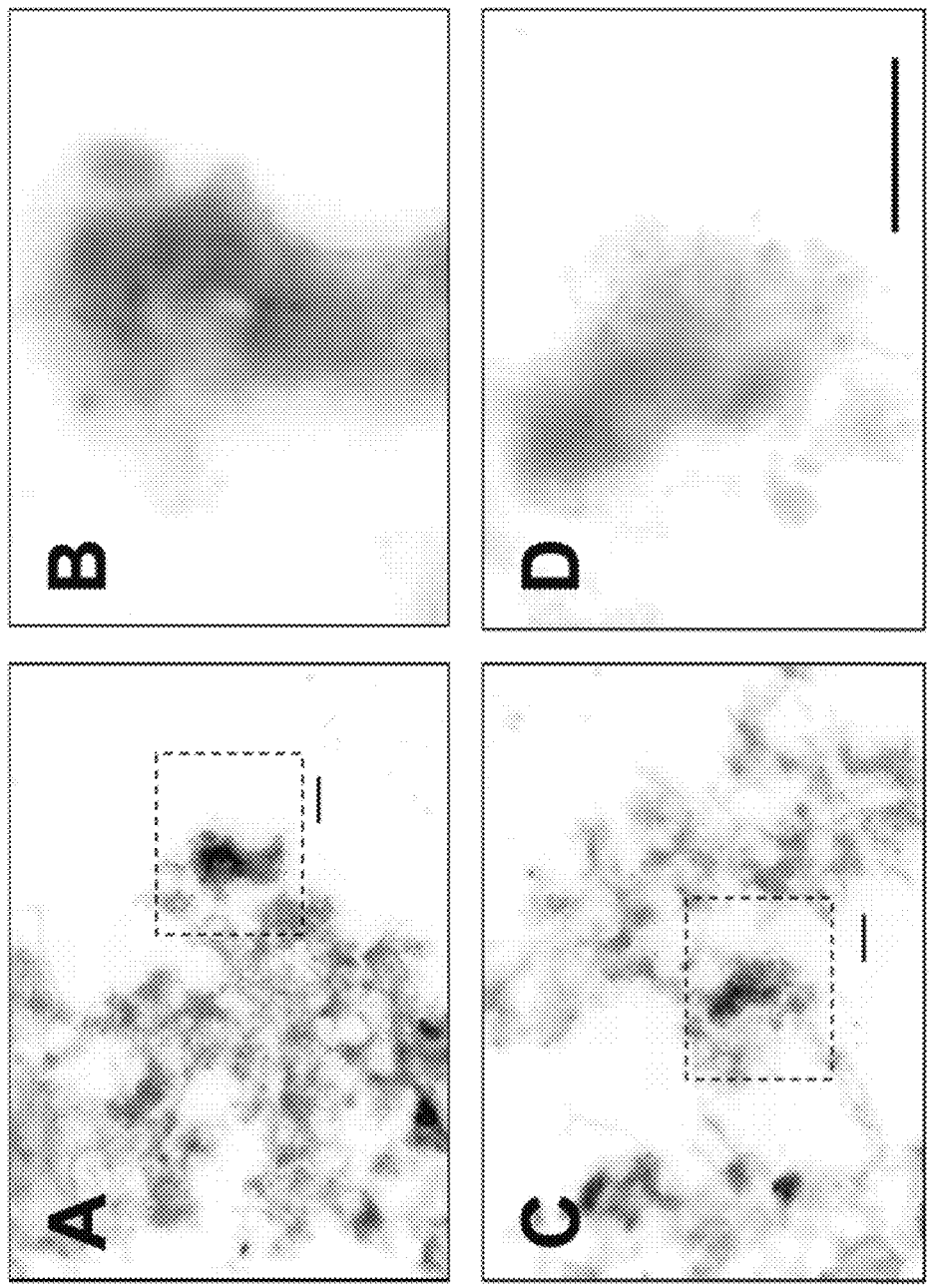
FIGS. 17(A) through (D) are representative FISH images of the AOB Nitrosospira (A and B; black/dark gray) and NOB Nitrospira (C and D; black/dark gray) in samples collected from freshly settled sludge from 5 ft (A, B) and 35 ft (C, D) from the inlet of the secondary clarifier of the TS WTP. Images B and D are higher magnification images of A and C (dashed boxes), respectively. Flocs are DAPI stained (light gray). Size bars are 10 microns.

FISH Analysis of Freshly Settled Sludge from the Secondary Clarifier of the MLE System at the SCB WRF In contrast to HC AWTP, the SCB WRF exhibited high levels of Nitrosomonas, as seen in FIGS. 15(A) and (B), while the Nitrosospira were at very low levels. Near the inlet, large flocs with attached microcolonies of Nitrosomonas were observed, seen in FIG. 15(B). Further from the inlet, smaller flocs with Nitrosomonas and detached microcolonies of Nitrosomonas were present. The distribution of the Nitrosomonas with respect to the distance from the inlet of the secondary clarifier is presented in FIG. 16. Twelve feet from the inlet, large flocs with little or no Nitrosomonas were observed. Interestingly, the overall average abundance of the Nitrosomonas was estimated at 7.0%, which is more than double the predicted AOB abundance (3.2%) based on the stoichiometry of ammonium oxidation and the operating conditions. The elevated level of Nitrosomonas suggests that these nitrifying bacteria may be denitrifying in the anoxic basin. Both NOB, Nitrobacter and Nitrospira, were present at levels below 1%. The low levels of NOB provide a challenge for characterization of their distribution by FISH analysis.

Additional FISH analysis revealed an uneven distribution of Anammox bacteria that resembled the AOB. The presence of the Anammox bacteria may explain the low levels of NOB present in this system, since the Anammox bacteria compete with the NOB for nitrite.

FISH Analysis of Freshly Settled Sludge from the Secondary Clarifier of the BP5 System at the TS WTP In contrast to both HC AWTP and SCB WRF, the TS WTP exhibited high levels of *Nitrosospira* and *Nitrospira*, seen in FIGS. 17(A) through (D), and an even distribution of large flocs with attached microcolonies both nitrifying bacteria. Estimation of the abundance of the predominant nitrifying bacteria was not possible due to the very large size of the flocs and the limitations of the microscopy system. Only individual cells of *Nitrosomonas* and *Nitrobacter* were observed. Anammox bacteria were present in TS WTP in a similar manner as the AOB and NOB.

Three Types of Sludge with Respect to Nitrifying Bacteria

The FISH results from the three POTWs suggest that there are three types of sludge with respect to nitrifying bacteria and Anammox bacteria that are present in these BNR systems: (I) flocs with attached microcolonies of nitrifying bacteria and Anammox bacteria; (II) flocs without attached microcolonies of nitrifying bacteria and Anammox bacteria; and (III) microcolonies of nitrifying bacteria and Anammox bacteria. These three types of sludge also have different settling characteristics: Type I sludge typically settles near the inlet of the secondary clarifier; Type II sludge is also located near the inlet of the secondary clarifier, but further away compared to Type I sludge; and Type III sludge settles furthest away from the inlet due the size of the microcolonies. The HC AWTP exhibits Types II and III sludge; SCB WRF exhibits all three Types of sludge; and TS WTP exhibits Types I and II sludge.

Figure 18:
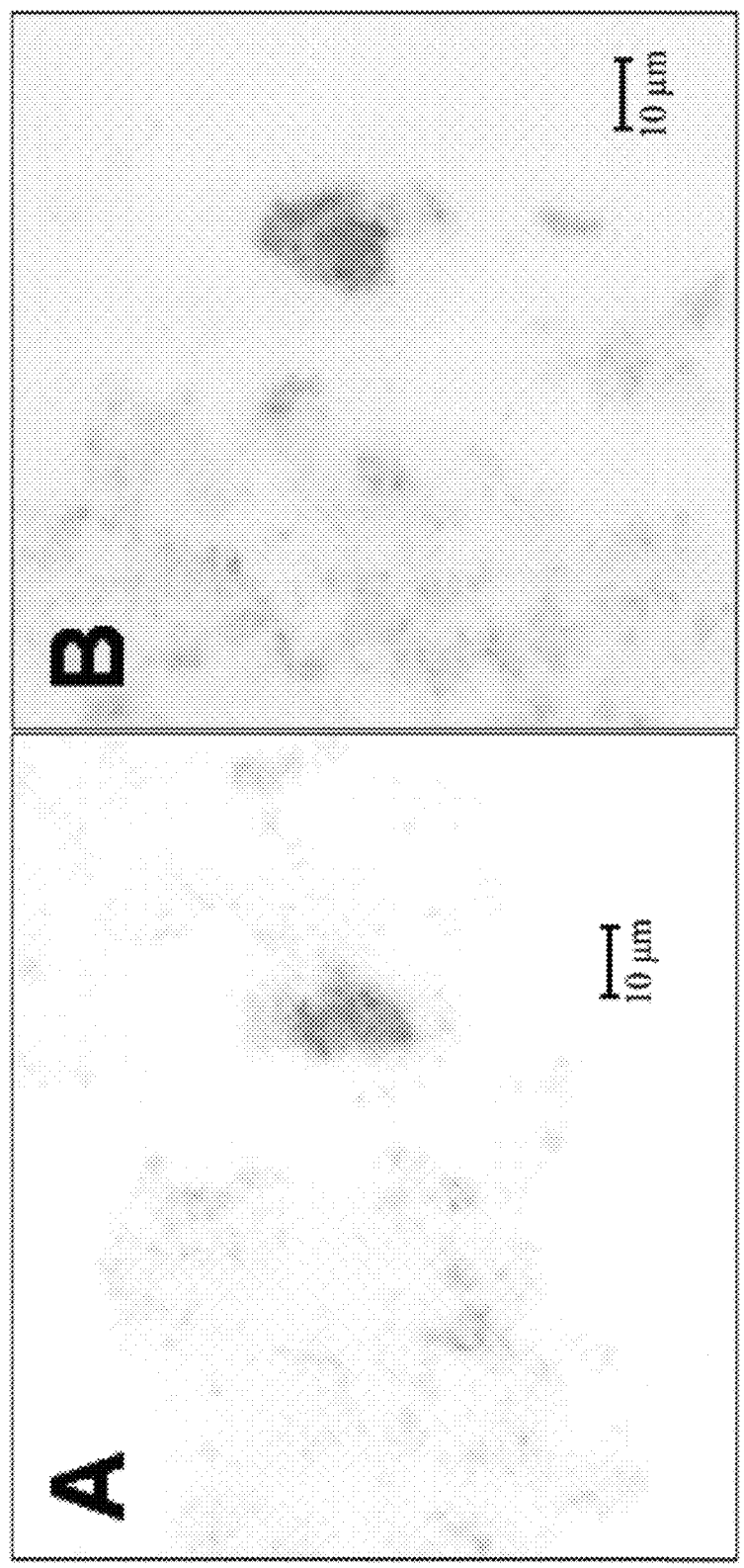
FIGS. 18(A) and (B) are representative FISH images of the Acinetobacter microcolonies associated with (A) or without flocs (B). Acinetobacter (A and B; dark gray) in samples collected from freshly settled sludge from influent (A) and 80 ft (B) from the inlet of the secondary clarifier of the High Purity $O_2$ System of the HC AWTP. Flocs are DAPI stained (light gray) and bars=10 μm.

The growth of microcolonies of nitrifying bacteria and Anammox bacteria on large flocs and eventual detachment from the large flocs does not appear to be restricted to the nitrifying bacteria and Anammox bacteria and may be a general phenomenon of activated sludge systems. Low levels of *Acinetobacter* cells were detected in the HC AWTP Nitrification system with an uneven distribution present, seen in FIG. 14, however, microcolonies of the *Acinetobacter* were not observed. Instead, the uneven distribution of the *Acinetobacter* was restricted to single cells or a small cluster of a few cells integrated into the flocs. The low abundance of *Acinetobacter* may be explained by the low Chemical Oxygen Demand (COD) levels in the Nitrification System. The lack of *Acinetobacter* cells in the slowly settling sludge in the second half of the secondary clarifier of the Nitrification System is consistent with the majority of the flocs consisting of high levels of nitrifying bacteria and Anammox bacteria. Although nitrifying bacteria and Anammox bacteria were not identified in the samples collected from the secondary clarifier of the HC AWTP High Purity $O_2$ System, high levels of *Acinetobacter* cells were observed throughout the secondary clarifier with some flocs exhibiting microcolony formation, seen in FIGS. 18(A) and (B). Gram negative, sulfate reducing bacteria have been reported to form microcolonies in activated sludge (Manz, W., M. Eisenbrecher, et al. (1998). "Abundance and spatial organization of Gram-negative sulfate-reducing bacteria in activated sludge investigated by in situ probing with specific 16S rRNA targeted oligonucleotides." *Fems Microbiology Ecology* 25(1): 43-61). These results suggest that the development of microcolonies requires basin conditions that are conducive for rapid growth by the bacteria.

Microcolony Formation Process

Figure 19:
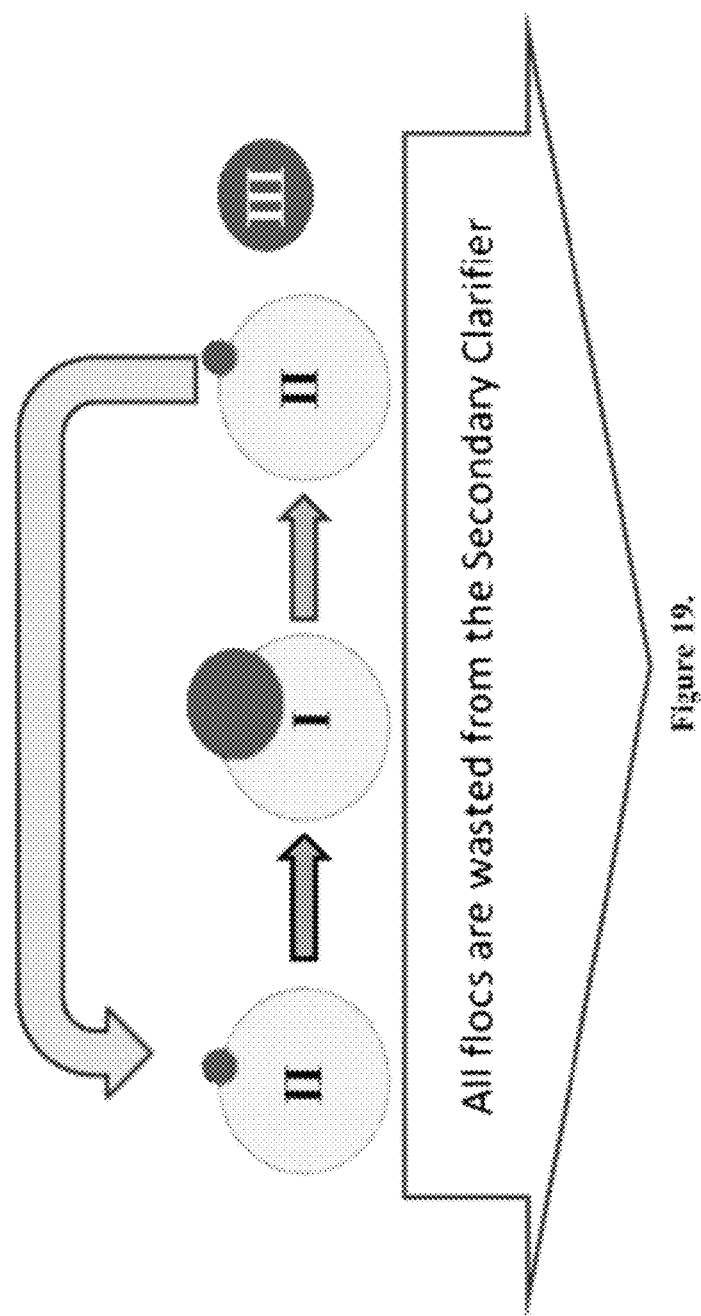
FIG. 19 is an illustration of the model to describe microcolony formation process in the Activated Sludge system. The seed for the microcolony (dark gray circle) on the large floc (white circle) grows over time (left-most horizontal arrow) and forms a large microcolony that eventually releases (right-most horizontal arrow) from the large floc. The cycle repeats (top-most arrow) and all flocs and microcolonies are under the same wasting pressure as shown by the large blue arrow. The three types of sludge are designated by Roman numerals.

A simple conceptual model, seen in FIG. 19, attempts to explain the presence of the three types of sludge with respect to nitrifying bacteria and Anammox bacteria as a function of the internal recycle rate of BNR systems. This model may extend beyond the nitrifying bacteria and Anammox bacteria and include other bacteria capable of microcolony formation. In this dynamic process, large flocs with few cells of nitrifying bacteria or Anammox bacteria on the surface settle in the first half of the clarifier due to the large size and density. Over time, the few cells of nitrifying bacteria or Anammox bacteria multiply and develop into a large microcolony or cluster of approximately 10-μm diameter. High shear forces, quorum sensing, or some other mechanism causes detachment of the microcolony or cluster from the large floc. This detachment does not completely remove all the cells associated with the microcolony or cluster. The released microcolony or cluster of nitrifying bacteria or Anammox bacteria is much smaller and has a lower density and different settling properties compared to the large floc.

With a simple conceptual model in place that describes the microcolony formation process for nitrifying bacteria and Anammox bacteria in BNR systems, an analysis of the operating parameters of the three POTWs suggested a simple explanation for the different types of sludge present.

Figure 20:
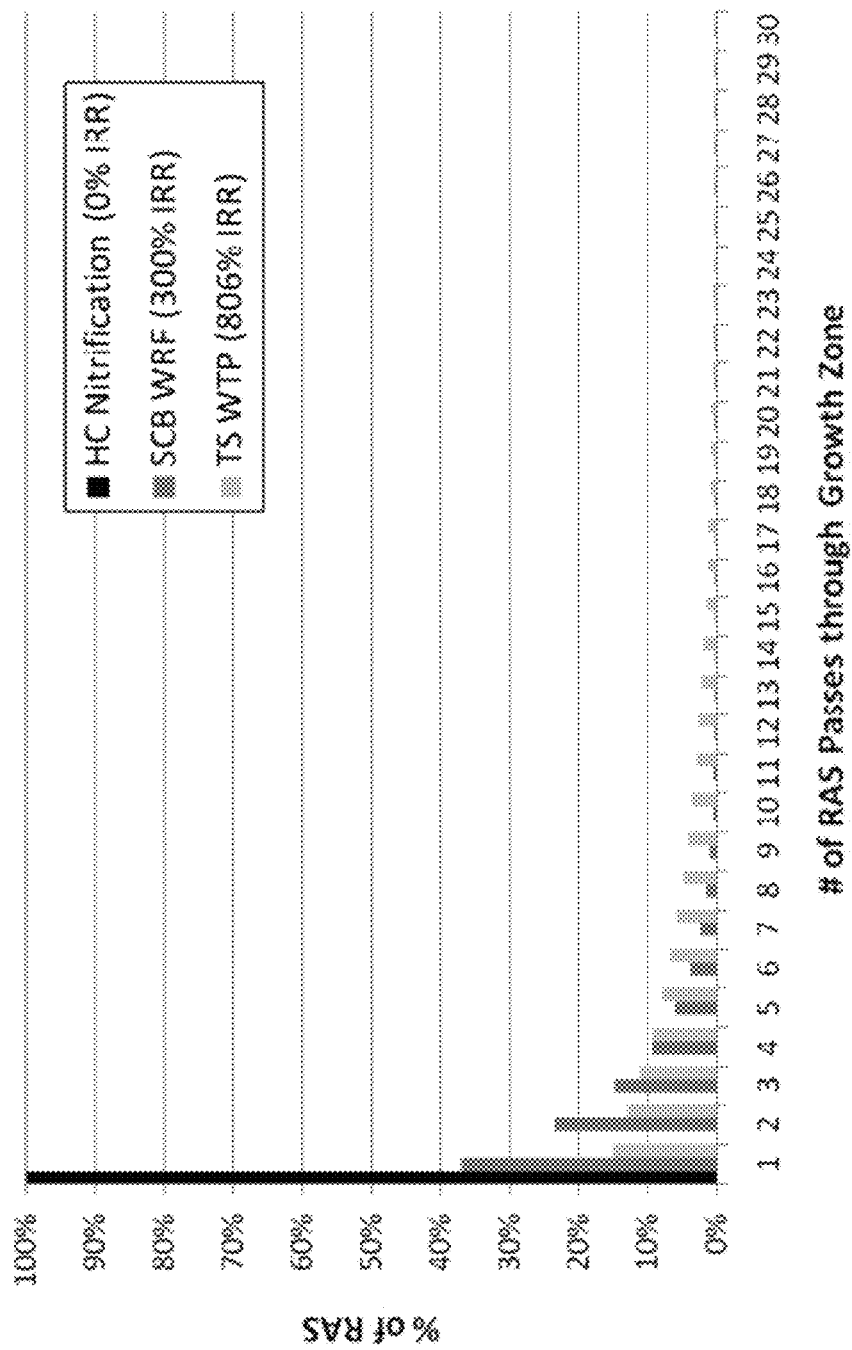
FIG. 20 is a graph showing the distribution of new RAS for 3 POTWs entering the growth zone (anoxic and/or aeration basin) is presented as a function of the number of passes through the growth zone.

Microcolony Formation Process and Impact of the Internal Recycle Rate of BNR Systems For most BNR systems, the internal recycle of treated wastewater is used to provide nitrate for denitrification in the anoxic basin and effectively dilute the concentration of nitrate in treated wastewater entering the secondary clarifier. Higher internal recycle rates (IRR) result in lower nitrate concentrations in treated wastewater, but require additional basin capacity to ensure sufficient hydraulic residence time for biological treatment. The IRR has a direct impact in the number of times that activated sludge passes through the growth zone (aerobic and/or anoxic basins) as shown in FIG. 20.

Figure 21:
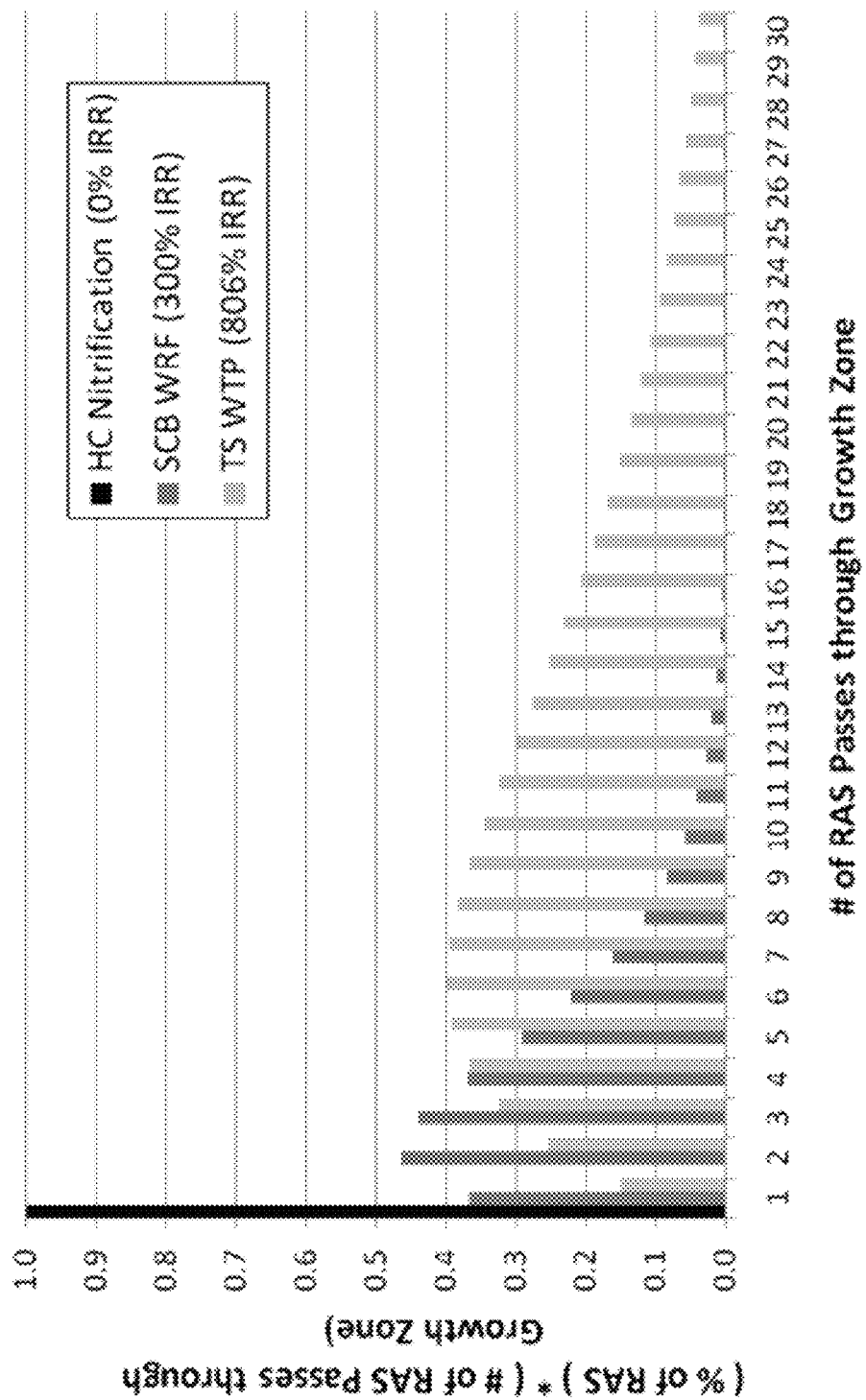
FIG. 21 is a graph showing the product of the distribution of new RAS for three POTWs and the number of passes through the growth zone by RAS as a function of the number of passes through the growth zone.

As expected, the fraction of activated sludge with numerous passes through the growth zone diminishes due to the IRR and beyond four passes, the percent of activated sludge drops below 10% for the MLE and BP5 systems, seen in FIG. 20. However, the product of the number of passes and the fraction of activated sludge corresponding to the number of passes reveals a greater impact on the total growth of bacteria, seen in FIG. 21. The three BNR systems can be compared directly to each other by a simple calculation of the average number of passes through the growth zone. The average number of passes through the growth zone by activated sludge entering the growth zone for the first time (i.e., RAS) can be calculated by first determining the recycle rate (internal recycle flow rate/total flow rate entering the growth zone) and then using this recycle rate in a simple formula, shown below.

$$\text{Average \# of Passes Through Growth Zone} = 1/(1 - \text{Recycle Rate}) \quad (10)$$

The average number of passes through the growth zone for the three BNR systems was determined (HC AWTP Nitrification System=1.0; SCB WRF=2.7; and TS WTP=6.7). It is clear that the IRR contributes to the generation of large flocs and microcolonies of nitrifying bacteria and Anammox bacteria by providing a mechanism for multiple opportunities for growth without being subjected to the primary floc disruption process, the RAS pump.

For the TS WTP BP5, it is unclear how this excessive recycle of new RAS with PAO is impacted, but the effect of excessive aeration on phosphorus accumulation has been reported (Brdjanovic, D., A. Slamet, et al. (1998). "Impact of excessive aeration on biological phosphorus removal from wastewater." *Water Research* 32 (1): 200-208). Using a standard staining technique, a preliminary evaluation of sludge exiting the fermentation zone of another local POTW utilizing the BP5 process (Oldsmar Wastewater Treatment Plant; 722% IRR) revealed that approximately 80% of PAO microcolonies exhibited no appreciable accumulation of polyhydroxybutyrate (PHB) (data not shown) (Jenkins, D., M. G. Richard, et al. (1993). *Manual on the Causes and Control of Activated Sludge Bulking and Foaming*. Chelsea, Mich., Lewis Publishers).

Figure 22:
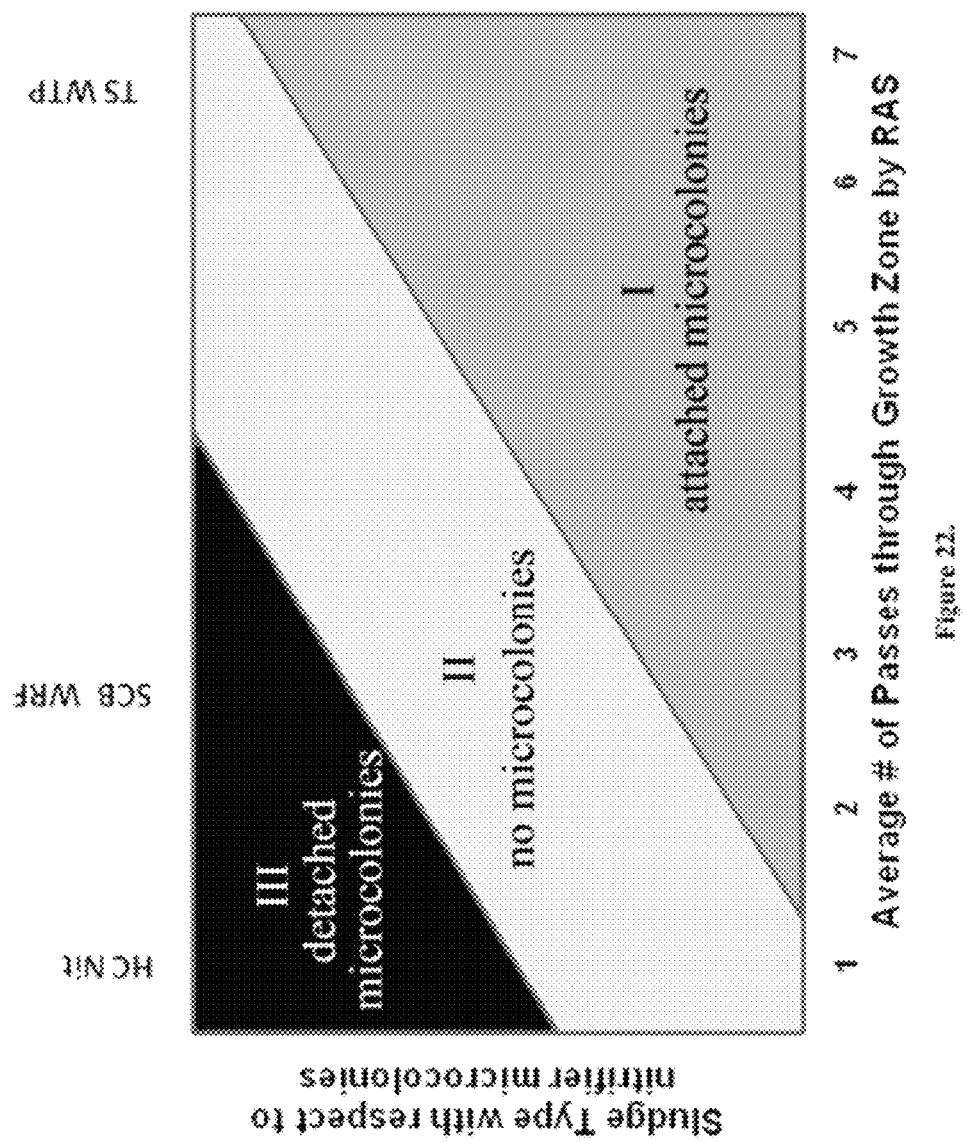
FIG. 22 is an illustration of the model showing the sludge type as a function of the average number of passes of RAS through the growth zone for three POTW with unique BNR systems.

In FIG. 22, the FISH results of the three BNR systems were used to suggest regions for the three types of sludge as a function of the average number of passes through the growth zone by RAS. In this figure, operation with elevated IRR predicts the presence of Types I and II sludge. With lower IRR, the growth benefit of the IRR is balanced by the floc shear of the RAS pump, which results in the presence of detached microcolonies of nitrifying bacteria and Anammox bacteria (Type III sludge). Lack of IRR results in sludge that is dominated by the floc shear of the RAS pump (Types II and III). FISH evaluation of the nitrifier and Anammox bacteria abundance of freshly settled sludge samples collected from the secondary clarifier of additional BNR systems will be needed to definitively determine the regions of the three sludge types with respect to the number of passes through the growth zone. If this relationship is found to be accurate, then it suggests that the distribution of nitrifying bacteria and Anammox bacteria with respect to different types of sludge may be altered by adjusting the average # of passes through the growth zone by RAS by either adjusting the internal recycle rate or increasing the exposure of RAS to shear for intentional microcolony detachment. The control of the distribution of the nitrifying bacteria and Anammox bacteria in the secondary clarifier of BNR systems may provide new opportunities for improving performance.

The FISH results presented in this study suggest that a microcolony formation process that is sensitive to the internal recycle rate may be responsible for the distribution of nitrifying bacteria and Anammox bacteria in freshly settled sludge of secondary clarifiers of BNR systems. A comprehensive understanding of this conceptual model may lay the foundation for new approaches towards optimizing the microbial ecology of suspended growth systems for improved performance.

Example 4

Adjustment of the Internal Recycle Rate to Uncouple SRT

Figure 23:
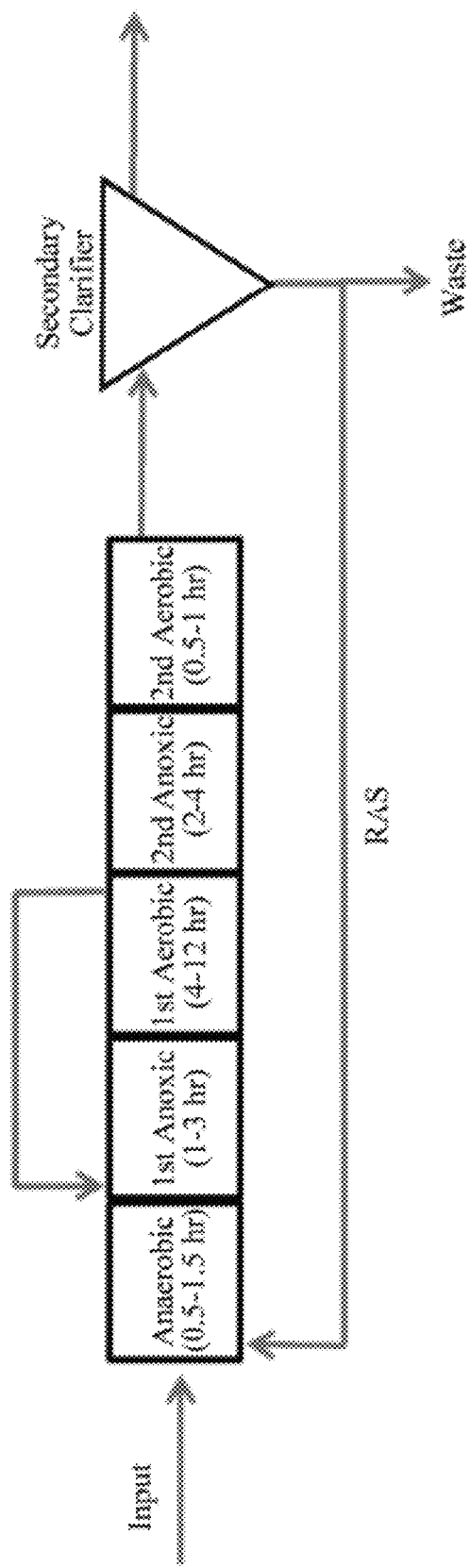
FIG. 23 is an illustration showing the typical layout of a BP5 system. Hydraulic residence times are provided for each stage according to the basin volume and plant influent.

The Internal Recycle Rate (IRR) was analyzed on the Howard F. Curren Advanced Wastewater Treatment Plant (HC AWTP), South Cross Bayou Water Reclamation Facility (SCB WRF), and Oldsmar Wastewater Treatment Plant (OWTP). The HC AWTP utilizes two separate activated sludge systems in series, which removes carbonaceous biochemical oxygen demand (BOD) with a high purity oxygen reactor in the first train and ammonium is biologically oxidized (nitrification) to nitrate in the second train. The SCB WRF utilizes the modified Ludzack-Ettinger (MLE) process which consists of an anoxic and aeration basin followed by a secondary clarifier. A portion of the treated wastewater is recycled from the end of the aeration basin to the beginning of the anoxic basin. This internal recycle rate (IRR) is 300% of the influent flow rate for the MLE system. The internal recycle serves remove the nitrate by denitrification in the anoxic basin (nitrate converted to nitrogen gas) and also dilutes the nitrate concentration of the treated wastewater. OWTP utilizes a BardenPho 5-stage (BP5) configuration for biological removal of nitrogen and phosphorus. A typical BP5 system layout, as seen in FIG. 23. Like other BP5 systems in Florida, OWTP does not remove primary solids by clarification prior to treatment by the BP5. The primary solids are used in the $1^{st}$ stage of the BP5 for fermentation, which generates volatile fatty acids (VFA). This fermentation basin is necessary for biological phosphorus removal, because these VFA are taken up by the PAO and converted to poly-beta-hydroxybutyrate (PHB), a carbon and energy storage polymer, and the PAO hydrolyze polyphosphate granules and release phosphate. The next two stages are similar to the MLE configuration with an anoxic ($2^{nd}$ stage) and aeration basin ($3^{rd}$ stage) in series. The anoxic basin provides conditions that are conducive for denitrification, while the aeration basin provides conditions for cBOD removal, ammonium oxidation (nitrification), and POA uptake of phosphorus and simultaneous PHB oxidation.

Like the MLE system, BP5 systems use an internal recycle to transfer a fraction of the treated wastewater from the end of the aeration basin back to the beginning of the anoxic basin for denitrification of the nitrate-rich wastewater. However, the OWTP utilizes a very high IRR of 722% of the influent flow rate to the BP5 system. Two more stages provide additional treatment with a second anoxic basin ($4^{th}$ stage) and aeration basin ($5^{th}$ stage) before the treated wastewater is transferred to the secondary clarifier. The return activated sludge is pumped back to the beginning of the BP5 system.

Figure 24:
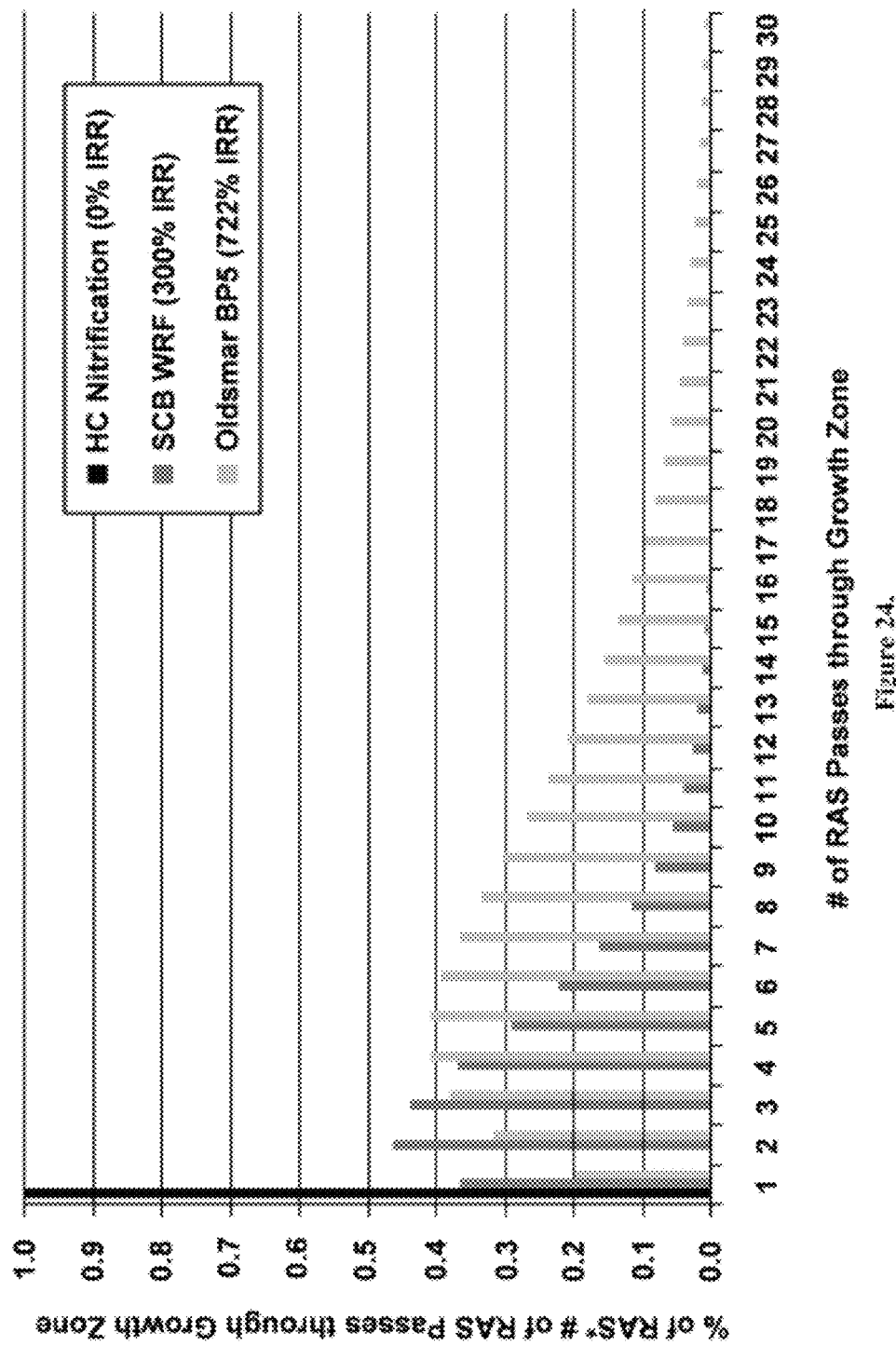
FIG. 24 is a graph showing the Internal Recycle Rate impact on the additional passes of RAS through the growth zone for three POTW with unique BNR systems.

An evaluation of the freshly settled sludge in the secondary clarifier of the OWTP BP5 system revealed very large flocs with nitrifiers present in high levels. The nitrifiers grew on the surface of these large flocs, but their size was much greater than the microcolonies observed at HC AWTP and SCB WRF. Another BP5 system (data not shown) had consistent results. An evaluation of the impact of the IRR suggested that the excessive IRR provides an unreported mechanism for the growth of flocs and associated populations. The IRR has a direct impact in the number of times that activated sludge passes through the growth zone (aerobic and/or anoxic basins) as shown in FIG. 24. Although the fraction of activated sludge with numerous passes through the growth zone diminishes due to the IRR, the higher number of passes increases the abundance of nitrifiers and heterotrophs and therefore, the size of these flocs.

Figure 25:
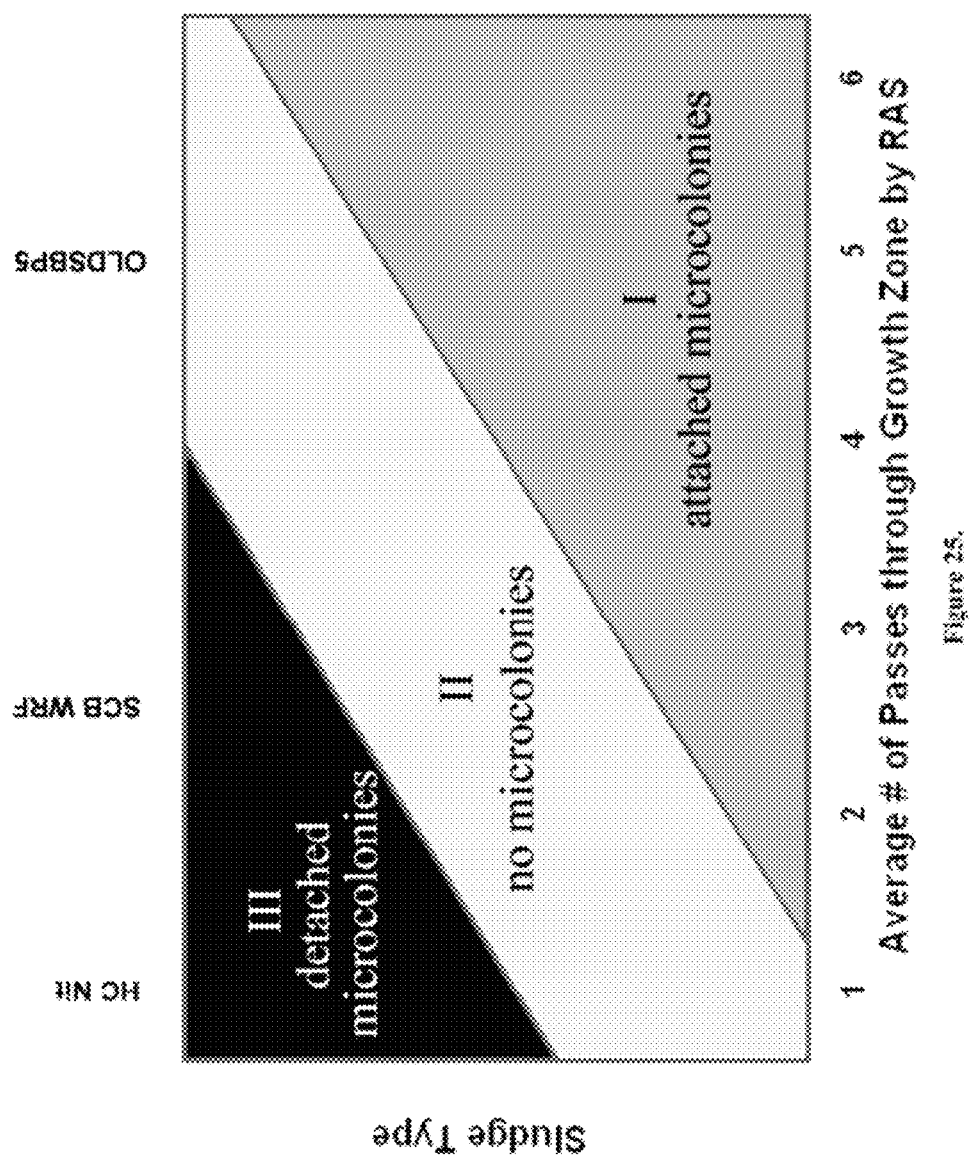
FIG. 25 is an illustration of the model showing the sludge type as a function of the average number of passes of RAS through the growth zone for three POTW with unique BNR systems.

The average number of passes through the growth zone for the three BNR systems was determined, using Equation (10), and plotted versus the three types of distinct sludges with respect to nitrifier content, seen in FIG. 25. In this figure, the suggested regions for the three sludge types is a function of the number of passes through the growth zone. FISH evaluation of the nitrifier abundance of freshly settled sludge samples collected from the secondary clarifier of additional BNR systems definitely determine the regions of the three sludge types with respect to the number of passes through the growth zone.

Figure 26:
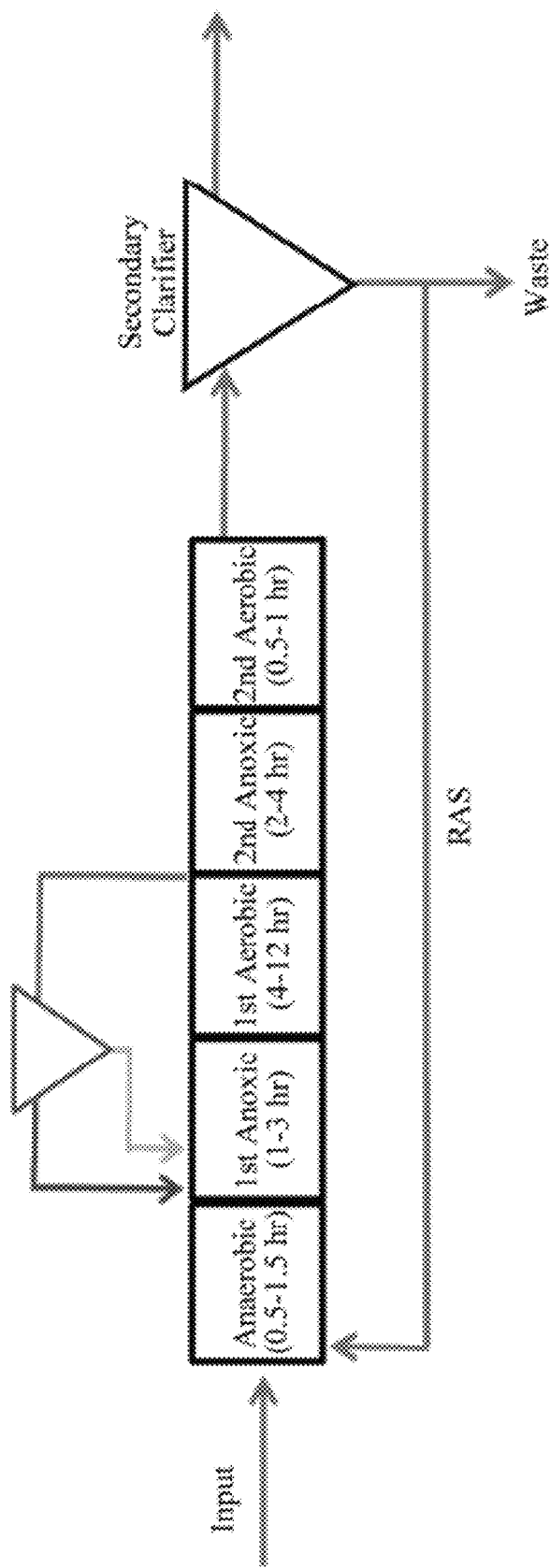
FIG. 26 is an illustration showing the BP5 system incorporating an internal clarifier system. Sludge with large flocs are transferred through to the $1^{st}$ anoxic basin (gray line) via a sludge pump, promoting shearing of the large flocs for microcolony detachment. Microcolonies of nitrifying bacteria and Anammox bacteria (black line) and large flocs without microcolonies (light gray) are passed though an internal clarifier and transferred to the $1^{st}$ anoxic basin.
Figure 27:
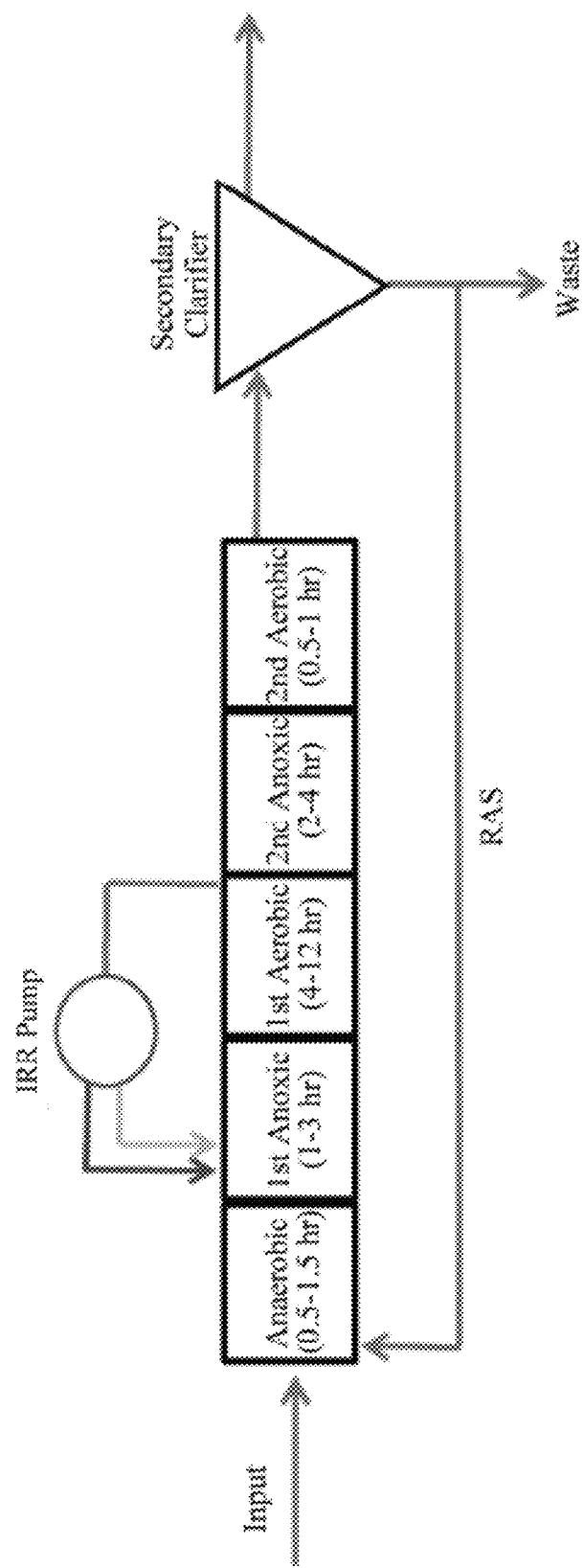
FIG. 27 is an illustration showing the BP5 system incorporating new internal recycle pumps that promote shear. IRR pumps are replaced with shearing pumps which detach microcolonies from flocs and transfer the flocs (light gray line) and microcolonies (black line) to the $1^{st}$ anoxic basin.
Figure 28:
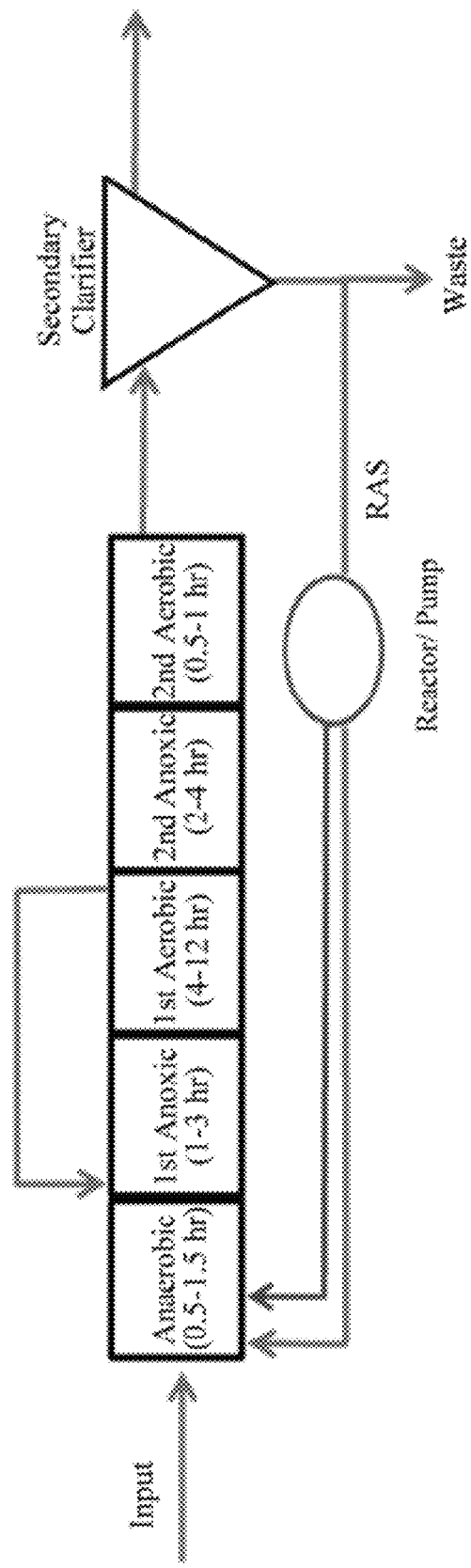
FIG. 28 is an illustration showing the BP5 system incorporating new reactor with sludge pumps to promote shearing of RAS. The type III sludge containing microcolonies (black line) and RAS sludge (light gray line) are returned to the anaerobic basin.

Assuming the general relationship between IRR and the 3 types of sludge, then employment of the selective wasting strategy for uncoupling the SRT of the nitrifiers may require additional equipment. This new equipment would provide a process for exposing the sludge to shear conditions in the internal recycle or the RAS. FIGS. 26-28 provide guidance on two ways to add a new unit process (internal clarifier with high shear pump) or replace existing IRR pumps or introduce a new RAS processing reactor with the intent of providing shearing conditions for the detachment of the nitrifier microcolony from large flocs. It may only be necessary to process a fraction of the internal recycle flow rate or RAS in order to generate the uneven distribution of nitrifying bacteria in the secondary clarifier.

Example 5

Beyond Nitrification

Selective wasting of activated sludge can be used to increase the SRT and therefore, the concentration of other targeted bacterial populations with functional importance, but slow specific growth rates. This approach may be applied towards these bacteria, if they exhibit an uneven distribution in the newly settled sludge in secondary clarifiers.

Anaerobic digesters are operated at SRT of 15-20 days, but still suffer from poor turnover of volatile fatty acids, such as propionate, to methane. This conversion of propionate to methane is carried out by two slow-growing microorganisms: syntrophic bacteria and methanogens. When propionate accumulates in anaerobic digesters, the pH drops and effectively inhibits the methanogens. This approach may be of interest in increasing the concentration of both syntrophic bacteria and methanogens in anaerobic digesters, if these populations can be segregated from the other bacteria in biosolids. A special, anaerobic clarifier that offers separation of biosolids particles would be needed to effectively uncouple the SRT of these functionally important microorganisms by wasting biosolids without these microorganisms.

Construction considerations include the cost of the equipment necessary for the SRT Uncoupler (i.e., selective wasting). With retrofits of existing POTW, the additional equipment may include an enhanced aeration system (blower, piping, and diffusers), pumps, anoxic basin capacity, and secondary clarifier capacity. For new construction, the SRT Uncoupler should include all of the typical equipment for the biological nitrogen removal (BNR) system and the selective wasting technology. The two most common BNR systems are the MLE and Bardenpho systems. Both systems utilize basins operated to achieve aerobic, anoxic, and anaerobic (Bardenpho) conditions. Large aeration basins are necessary for both systems to ensure adequate nitrification. In addition, both systems use aeration systems, secondary clarifiers and internal recycle pumps. While the SRT Uncoupler will include the additional equipment costs for selective wasting, the aeration basin size is much smaller compared to the conventional system.

In the preceding specification, all documents, acts, or information disclosed do not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a bacteria uncoupler and method of enhancing nitrogen removal from wastewater, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. A method of enhancing nitrification or anaerobic ammonium oxidation in wastewater comprising the steps of:
    determining the settling location of nitrifying bacteria or Anammox bacteria in a secondary clarifier, further comprising:
    obtaining samples of settled waste solids at predetermined sampling locations in the secondary clarifier;
    testing the samples using genus-specific analysis to determine the settling characteristics and concentrations of bacteria in the secondary clarifier;
    disposing an inlet port in the secondary clarifier to collect a recycling bacteria at the settling location of the recycling bacteria in the secondary clarifier, wherein the recycling bacteria is nitrifying bacteria or Anammox bacteria, or disposing an inlet port in the secondary clarifier to collect waste bacteria in the secondary clarifier and discarding the waste bacteria, where the waste bacteria is non-nitrifying bacteria or Anammox bacteria;
    returning the recycling bacteria to at least one wastewater basin to remove nitrogen contaminants from the wastewater.

2. The method of claim 1, wherein the inlet port is a Waste Activated Sludge inlet or a Waste Activated Sludge rake;
    wherein the Waste Activated Sludge inlet further comprises at least one negative pressure housing having at least one horizontal face, and wherein the housing is disposed on the floor of the clarifier;
    a negative pressure manifold disposed on the at least one horizontal face of the negative pressure housing;
    a negative pressure line in fluid communication with the negative pressure manifold on a first end and a negative pressure source on a second end;
    a control module in fluid communication with the negative pressure source;
    wherein the Waste Activated Sludge rake further comprises at least one horizontal support arm;
    a plurality of vertical support members disposed on the at least one horizontal support arm;
    a plurality of selective inputs disposed on the at least one horizontal support arm or disposed on the plurality of vertical support members;
    a plurality of negative pressure lines, wherein a negative pressure line is fluidly connected to each selective input on a first end and a negative pressure source on a second end; and
    a control module in fluid communication with the negative pressure source.

3. The method of claim 2, wherein the negative pressure source further comprises an air pump; a liquid pump; or a vacuous container.

4. The method of claim 2, further comprising a negative pressure valve, wherein the negative pressure valve is a solenoid valve.

5. The method of claim 2, wherein the Waste Activated Sludge rake comprises
    an upper horizontal support arm;
    a plurality of vertical support members having an upper end and a lower end, wherein the upper end of the vertical support members is disposed on the upper horizontal support arm;
    a lower horizontal support arm disposed below the upper support arm, and wherein the lower end of the plurality of vertical support members is disposed on the lower horizontal support arm;

at least one sludge blade having an upper end and a lower end, wherein the upper end of the at least one sludge blade is disposed on the lower horizontal support arm;

a plurality of selective inputs disposed on the plurality of vertical support members, the lower horizontal support arm, the at least one sludge blade, or a combination thereof;

a plurality of negative pressure lines, wherein a negative pressure line is fluidly connected to each selective input on a first end and a negative pressure source on a second end; and a control module in fluid communication with the negative pressure source.

6. The method of claim 2, wherein the inlet port is disposed in the outer half of the secondary clarifier to collect the recycling bacteria or disposed in the inner half of the secondary clarifier to collect waste bacteria in the secondary clarifier;

wherein in inner half of the secondary clarifier is defined as the distance equal or less than about one-half the diameter of a round clarifier and the outer half of the secondary clarifier is defined as the distance equal or greater than about one-half the diameter of a round clarifier, or wherein the inner half of the secondary clarifier is defined as the distance equal or less than about one-half the length of a linear clarifier, as measured from the clarifier inlet, and the outer half of the secondary clarifier is defined as the distance equal or greater than about one-half the length of the clarifier, as measure from the clarifier inlet, where the linear clarifier is square or rectangular.

7. The method of claim 1, wherein the genus-specific analysis is selective culturing, probing, nucleic acid-based identification, sequence-based identification, immunohistochemistry, lab-scale bioreactors that are adapted to measure the specific rate of nitrification or anaerobic ammonium oxidation.

8. The method of claim 7, wherein the immunohistochemistry is fluorescence in situ hybridization.

9. The method of claim 1, wherein the predetermined sampling locations are
10 feet, 40 feet, 55 feet, 70 feet, 85 feet, 100 feet, 140 feet, 155 feet, 170 feet or combinations thereof from the inlet for a High Purity $O_2$ System and Nitrification System;
8 feet, 13 feet, 18 feet, 23 feet, 28 feet, 33 feet, 38 feet, 45 feet, 55 feet or combinations thereof from the inlet for a Modified Ludzack-Ettinger system; or
5 feet, 8.5 feet, 10.5 feet, 12.5 feet, 15 feet, 20 feet, 25 feet, 30 feet, 32.5 feet, 37.5 feet of combinations thereof from the inlet for a BardenPho 5-Stage system.

10. The method of claim 8, wherein the sample collected is 1 mL collected from the top one-inch layer of the sludge blanket.

11. The method of claim 1, further comprising at least one internal recycle rate pump or a recycled activated sludge reactor in fluid communication with the inlet port and the at least one wastewater basin, wherein the at least one internal recycle rate pump or the recycled activated sludge reactor is adapted to provide shearing conditions to detach the recycling bacteria from flocs.

12. The method of claim 1, further comprising
adding a predetermined amount of a heterotrophic bacteria having known and distinct settling properties to the aeration basin.

13. The method of claim 12, wherein the heterotrophic bacteria is a phosphorus accumulating organisms or bioaugmentation bacteria.

14. The method of claim 12, wherein the heterotrophic bacteria is added to the aeration basin as a mixed culture or a pure culture.

15. The method of claim 12, wherein the heterotrophic bacteria are attached to a biodegradable or non-biodegradable media, wherein the bacteria grown in biodegradable or non-biodegradable media settles in discrete locations in the secondary clarifier.

16. The method of claim 1, further comprising adding nitrifying bacteria or Anammox bacteria to the wastewater, wherein the nitrifying bacteria or Anammox bacteria are grown in a biodegradable or non-biodegradable media,
wherein the bacteria grown in biodegradable or non-biodegradable media settles in discrete locations in the secondary clarifier.

* * * * *